(12) United States Patent
Perez Martinez et al.

(10) Patent No.: US 12,177,926 B2
(45) Date of Patent: Dec. 24, 2024

(54) MANAGING SERVICE FUNCTION CHAINS

(71) Applicant: Telefonaktiebolaget LM Ericsson (publ), Stockholm (SE)

(72) Inventors: Alfonso de Jesus Perez Martinez, Madrid (ES); Juan Jose Delgado Reimundez, Madrid (ES); Rodrigo Alvarez Dominguez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 392 days.

(21) Appl. No.: 17/784,333

(22) PCT Filed: Mar. 3, 2020

(86) PCT No.: PCT/EP2020/055558
§ 371 (c)(1),
(2) Date: Jun. 10, 2022

(87) PCT Pub. No.: WO2021/155960
PCT Pub. Date: Aug. 12, 2021

(65) Prior Publication Data
US 2023/0058366 A1 Feb. 23, 2023

(30) Foreign Application Priority Data
Feb. 4, 2020 (EP) .................................... 20382073

(51) Int. Cl.
*H04W 76/20* (2018.01)
*H04W 24/10* (2009.01)

(52) U.S. Cl.
CPC ........... *H04W 76/20* (2018.02); *H04W 24/10* (2013.01)

(58) Field of Classification Search
CPC .. H04W 76/20; H04W 24/10; H04L 41/0894; H04L 41/0895; H04L 41/40; H04L 41/5051
See application file for complete search history.

(56) References Cited

U.S. PATENT DOCUMENTS

| 2017/0250903 A1* | 8/2017 | Rasanen ................. H04L 41/50 |
| 2018/0176281 A1* | 6/2018 | Arunachalam ..... H04L 43/0829 |

(Continued)

FOREIGN PATENT DOCUMENTS

| EP | 1550329 A2 | 7/2005 |
| EP | 3468236 A1 | 4/2019 |

(Continued)

OTHER PUBLICATIONS

3rd Generation Partnership Project, "3rd Generation Partnership Project; Technical Specification Group Core Network and Terminals; Interface between the Control Plane and the User Plane Nodes; Stage 3 (Release 16)", Technical Specification, 3GPP TS 29.244 V16.1.0, Sep. 1, 2019, pp. 1-240, 3GPP, France.

(Continued)

*Primary Examiner* — Steven Hieu D Nguyen
(74) *Attorney, Agent, or Firm* — Weisberg I.P. Law, P.A.

(57) ABSTRACT

A method (700) in a policy control function, PCF, of moving a session from a service function chain, SFC, to a new SFC, wherein the SFC comprises a first SF that modifies packets in the session. The method comprises determining (702) to update a second SF in the SFC for the session, determining (704) a new SFC for the session comprising new SFs, wherein the new SFs are selected based on the determined update to the second SF and information related to the packet modification performed by the first SF and (706) sending a first message to a session management function, SMF, comprising updated policy control rules for the ses- (Continued)

sion, wherein the updated policy control rules comprise an indication of the new SFC for the session.

20 Claims, 15 Drawing Sheets

(56) References Cited

U.S. PATENT DOCUMENTS

| | | | |
|---|---|---|---|
| 2019/0014496 A1* | 1/2019 | Kim | H04W 28/06 |
| 2019/0357301 A1 | 11/2019 | Li et al. | |
| 2021/0044488 A1 | 2/2021 | Wu et al. | |

FOREIGN PATENT DOCUMENTS

| | | |
|---|---|---|
| WO | 2004034591 A2 | 4/2004 |
| WO | 2016033979 A1 | 3/2016 |
| WO | 2019035406 A1 | 2/2019 |
| WO | 2019206196 A1 | 10/2019 |

OTHER PUBLICATIONS

3rd Generation Partnership Project, "3rd Generation Partnership Project; Technical Specification Group Services and System Aspects; System Architecture for the 5G System (5GS); Stage 2 (Release 16)", Technical Specification, 3GPP TS 23.501 V16.2.0, Sep. 1, 2019, pp. 1-377, 3GPP, France.

3d Generation Partnership Project, "3rd Generation Partnership Project; Technical Specification Group Services and System Aspects; Policy and Charging Control Framework for the 5G System (5GS); Stage 2 (Release 16)", Technical Specification, 3GPP TS 23.503 V16.2.0, Sep. 1, 2019, pp. 1-101, 3GPP, France.

Halpern, E., et al., "Service Function Chaining (SFC) Architecture", Internet Engineering Task Force (IETF) Request for Comments 7665, Oct. 1, 2015, pp. 1-32, IETF.

\* cited by examiner

MANAGING SERVICE FUNCTION CHAINS

TECHNICAL FIELD

This disclosure relates to methods and network function nodes in a communications network. More particularly but non-exclusively, the disclosure relates to moving a session from a service function chain (SFC), to a new SFC in a communications network.

BACKGROUND

Generally, this disclosure relates to managing a service function chain associated with a user session in a communications network, such as a third generation (3G), fourth generation (4G) or fifth generation (5G) communications network. FIG. 1a shows a (prior art) configuration of a Third Generation Partnership Project (3GGP) 5G reference network architecture that is relevant to some embodiments herein. The 5G network reference architecture comprises a plurality of functions, e.g. functional building blocks with well-defined functional behaviors and external interfaces. The functions may be implemented in hardware but are increasingly implemented in software, for example in a service based architecture.

The 5G reference architecture in FIG. 1a comprises a user equipment (UE) 101, a Radio Access Network (RAN) 102, a User Plane Function (UPF) 103, a Data Network (DN) 104, an Access and Mobility Function (AMF) 105, an Authentication Server Function (AUSF) 106, a Session Management Function (SMF) 107, a Network Slice Selection Function (NSSF) 108, a Network Exposure Function (NEF) 109, a Network Repository Function (NRF) 110, a Policy Control Function 111, a Unified Data Management (UDM) node 112 and an Application Function (AF) 113. FIG. 1b shows a (prior art) 3GPP 5G core (5GC) architecture for policy, charging and analytics further comprising a Unified Data Repository (UDR) 114, a Network Data Analytics Function (NWDAF) 115, and a Charging Function (CHF) 116. The functionality of these network functions are described, for example, in the Third Generation Partnership Project 3GPP technical standard 3GPP TS 23.501.

This disclosure is primarily related to the Policy Control Function (PCF) 111, Session Management Function (SMF) 107, User Plane Function (UPF) 103 and the Unified Data Repository (UDR) 114, the functionality of which is summarized below.

PCF (Policy Control Function): The Policy Control Function (PCF) 111 supports unified policy framework to govern the network behaviour. With respect to the disclosure herein, the PCF 111 provides Policy and Charging Control (PCC) rules to the SMF 107.

SMF (Session Management Function): The Session Management function (SMF) 107 supports different functionality, e.g. session establishment, modify and release, and policy related functionalities like termination of interfaces towards policy control functions, charging data collection, support of charging interfaces and control and coordination of charging data collection at UPF 103. With respect to the disclosure herein, the SMF 107 receives PCC rules from the PCF 111 and configures the UPF 103 accordingly through the N4 reference point (Packet Forwarding Control Protocol (PFCP) protocol). According to the PFCP protocol, the SMF 107 controls the packet processing in the UPF 103 by establishing, modifying or deleting PFCP Sessions and by provisioning (e.g. adding, modifying or deleting) Packet Detection Rules (PDRs), Forwarding Action Rules (FARs), QoS Enforcement Rules (QERs) and/or Usage Reporting Rules (URRs) per PFCP session, whereby a PFCP session may correspond to an individual PDU session or a standalone PFCP session not tied to any PDU session. Each PDR contains a PDI specifying the traffic filters or signatures against which incoming packets are matched. Each PDR is associated to the following rules providing the set of instructions to apply to packets matching the PDI: (i) one FAR, which contains instructions related to the processing of the packets, specifically forward, duplicate, drop or buffer the packet with or without notifying the CP function about the arrival of a DL packet; (ii) zero, one or more QERs, which contains instructions related to the QoS enforcement of the traffic; and (iii) zero, one or more URRs, which contain instructions related to traffic measurement and reporting.

UPF (User Plane Function): The User Plane function (UPF) 103 supports handling of user plane traffic based on the rules received from SMF, specifically, for this IvD, packet inspection (through PDRs) and different enforcement actions, e.g. traffic steering, QoS, Charging/Reporting (through FARs, QERs, URRs).

DPI (Deep Packet Inspection), embedded in UPF 103, is a technology that supports packet inspection and service classification, which consists of IP packets classified according to a configured tree of rules so that they are assigned to a particular service session. DPI technology, offers two types of analysis:

Shallow packet inspection: extracts basic protocol information such as IP addresses (source, destination) and other low-level connection states. This information typically resides in the packet header itself and consequently reveals the principal communication intent.

Deep Packet Inspection (DPI): provides application awareness. This is achieved by analyzing the content in both the packet header and the payload over a series of packet transactions. There are several possible methods of analysis used to identify and classify applications and protocols that are grouped into signatures. One of them uses heuristic signatures which are determined based on behavioural analysis of the user traffic.

In Control and User Plane Separation (CUPS), the UPF reports to the SMF the capabilities it supports. The current standardized capabilities are summarised in 3GPP document 3GPP TS 29.244 v16.1.0 (September 2019).

UDR (Unified Data Repository): The 5G System architecture allows the UDM 112, PCF 111 and NEF 109 to store data in the UDR 114, including subscription data and policy subscription data and policy data by UDM 112 and PCF 111, structured data for exposure and application data (including Packet Flow Descriptions (PFDs) for application detection and AF 113 request information for multiple UEs) by the NEF 109.

Service Function Chaining: Service Function Chaining (SFC), also known as network service chaining, is a capability that creates a service chain of connected Service Functions (SF) (such as L4-7 like firewalls, network address translation (NAT), intrusion protection, QoS, etc.) and connects them in a virtual chain. This capability can be used by network operators to set up suites or catalogs of connected services that enable the use of a single network connection for many services, with different characteristics.

Dynamic Service Chaining enables customer service providers to configure and to control dynamically and programmatically network services. IETF SFC draft RFC 7665 defines a new data plane protocol specifically for the creation of dynamic service chains and is composed of the following elements: 1) Service Function Path identification (Service Function Classifier, SFC). The SFC is responsible for performing service classification and imposing a Network Service Header (NSH), sending the NSH packet to the first SFF in the path; 2) Transport independent service function chain (Service Function Forwarder). The SFF is responsible for forwarding traffic to one or more service functions according to the information of encapsulation (NSH); 3) Per-packet network and service metadata or optional variable TLV metadata.

SFC is standardized by the Internet Engineering Task Force, IETF and the reference architecture is summarised in the IETF's Request for Comments document number 7665, entitled "Service Function Chaining (SFC) Architecture".

SUMMARY

In 3GPP networks, service function chains SFCs are part of the User Plane (UP). The Service functions (SFs) and the SF Forwarder can be deployed in the N6 interface (so called N6-LAN) or within the UPF 103. SFCs are identified by a Chain-ID that is sent from the PCF 111 to the SMF 107 on a per user basis (e.g. in the PCC rules), and then the SMF 107 configures in the UPF 103 appropriate Packet Detection Rules (PDR) and Forwarding Action Rules (FAR). The chain-ID is included in the FAR.

The traffic steering policy ID is preconfigured by the PCF 111 on a per user basis. The SMF 107 translates the traffic steering policy ID to the UPF routing configuration (when it comes to service chaining, the SMF 107 includes the chain-ID in the FAR). The UPF 103 includes the chain-ID in the traffic that is passed to the SF Forwarder (e.g. in the NSH header). The SF Forwarder has a preconfigured mapping between the chain-ID and the ordered set of SFs for that particular chain.

The disclosure herein aims to improve upon scenarios where a SFC for a session needs to be modified or updated (for example, via the addition or deletion of one or more services in a service function chain), particularly where one or more service functions in the SFC modifies packets in the traffic flow.

Customer Service Providers may need to insert or remove service functions dynamically whilst keeping the state information stored in existing service functions. For example if a user is making a VoIP call by Facebook or whatsapp, a customer service provider may want to optimize this service by directing session traffic to a particular SF (e.g. the customer service provider may specify a particular SF for the VoIP call).

In order to achieve this, a service classifier will use DPI techniques to identify the corresponding traffic flows as a VoIP call and to insert the corresponding NSH packets towards SFF. However, if the service is identified based on a heuristic algorithm then identification/classification can take some time. Heuristic algorithms are used to identify services whose protocol is unknown or proprietary or hidden for security/safety reasons. In such circumstances, heuristic algorithms are applied to effectively "guess" or deduce the traffic packet type. Such heuristic algorithms may be indeterministic, for example, using statistical analysis, packet metadata and application attributes to identify services. As such, heuristic algorithms can take some time (e.g. a number of packets in a service may need to be send and monitored) to classify the traffic. As such, traffic flows may be allocated to a SFC incorrectly until a more accurate classification is determined (e.g. using statistic, signatures/metadata), at which point, once the heuristic algorithm has classified the packets, the session may need to be moved to a new SFC with more appropriate SFs for the session in view of the new classification.

In current implementations of dynamic SFC, modifications to SFCs are supported by destroying the existing service chain completely, followed by creating a new service chain instance that includes new and correct service function instances that properly handle the traffic (e.g. SFs to increase voice quality or comprising voice to save resources in a VoIP call).

However, this solution affects the service and impacts user experience since there are services that once packets are being handled by a SF, cannot be handled by a new SFC without dropping TCP connection and restarting the connection again. For example, if a SF acts as a HTTP proxy, this SF will open a new connection to the HTTP destination server on behalf of the user. The HTTP proxy will keep two TCP connections, one towards user, another one towards HTTP server. If this service needs to be migrated to another SF, the new SF must start again the TCP connection towards the user and the HTTP user.

In summary, a service classifier can take time to classify session packets and identify the most appropriate SFs for a session. This can result in traffic packets being be handled by a wrong (or sub-optimal) SF for some time until the service classifier changes or improves the identification. As such, a SFC may need to be migrated to a new SFC when the heuristic engine has finished its transient period. This may lead to the connection being reset, particularly if the SFC modifies the behavior of the connection and there is a need to migrate, modify (include/delete) a new SF in the SFC.

It is an object of embodiments herein to improve on such scenarios.

Thus according to a first aspect herein there is a method in a policy control function, PCF, of moving a session from a service function chain, SFC, to a new SFC, wherein the SFC comprises a first SF that modifies packets in the session. The method comprises determining to update a second SF in the SFC for the session; determining a new SFC for the session comprising new SFs, wherein the new SFs are selected based on the determined update to the second SF and information related to the packet modification performed by the first SF; and sending a first message to a session management function, SMF, comprising updated policy control rules for the session, wherein the updated policy control rules comprise an indication of the new SFC for the session.

In this manner, the PCF pre-configures a new service function chain for the session, that comprises the update to the second service function, whilst taking account of the modification to packets associated with the first service function, so as to ensure a smooth transition of the session from the SFC to the new SFC. Preconfiguring a new SFC in this manner, ensures that the TCP connection does not drop as the session is moved to the new SFC. Thus service traffic can be diverted to the correct SFC without dropping any session. This is efficient from a resource perspective to avoid impacting user experience.

According to a second aspect, there is a method in a session management function, SMF, of moving a session from a service function chain, SFC, to a new SFC, wherein the SFC comprises a first SF that modifies packets in the session. The method comprises: responsive to receiving a third message from a user plane function, UPF, associated with the session, the third message indicating that the first SF is modifying packets in the session, sending a second message to a policy control function, PCF, comprising a request for updated policy control rules for the session, wherein the second message comprises information related to the modification being performed by the first SF; receiving a first message from the PCF comprising the updated policy control rules for the session, wherein the updated policy control rules comprise an indication of a new SFC for the session, wherein the new SFC comprises new SFs selected by the PCF; and sending a fourth message to the UPF, the fourth message comprising the updated policy control rules for the session.

According to a third aspect there is a method in a user plane function, UPF, of moving a session from a service function chain, SFC, to a new SFC, wherein the SFC comprises a first SF that modifies packets in the session. The method comprises sending a third message to a session management function, SMF, the third message indicating that the first SF is modifying packets in the session; receiving from the SMF a fourth message, the fourth message comprising updated policy control rules for the session, wherein the updated policy control rules comprise an indication of a new SFC for the session; and moving the session from the SFC to the new SFC, based on the received updated policy control rules.

According to a fourth aspect there is a network function, NF, node for Policy Control, in a communications network, suitable for moving a session from a service function chain, SFC, to a new SFC. The SFC comprises a first SF that modifies packets in the session. The NF node comprises processing circuitry configured to: determine to update a second SF in the SFC for the session; determine a new SFC for the session comprising new SFs, wherein the new SFs are selected based on the determined update to the second SF and information related to the packet modification performed by the first SF; and send a first message to a session management function, SMF, comprising updated policy control rules for the session, wherein the updated policy control rules comprise an indication of the new SFC for the session.

According to a fifth aspect there is a network function, NF, node for session management, in a communications network, suitable for moving a session from a service function chain, SFC, to a new SFC. The SFC comprises a first SF that modifies packets in the session. The NF node comprises processing circuitry configured to: responsive to receiving a third message from a user plane function, UPF, associated with the session, the third message indicating that the first SF is modifying packets in the session, send a second message to a policy control function, PCF, comprising a request for updated policy control rules for the session, wherein the second message comprises information related to the modification being performed by the first SF; receive a first message from the PCF comprising the updated policy control rules for the session, wherein the updated policy control rules comprise an indication of a new SFC for the session, wherein the new SFC comprises new SFs selected by the PCF; and send a fourth message to the UPF, the fourth message comprising the updated policy control rules for the session.

According to a sixth aspect there is a network function, NF, node in the user plane, in a communications network, suitable for moving a session from a service function chain, SFC, to a new SFC. The SFC comprises a first SF that modifies packets in the session. The NF node comprises processing circuitry configured to: send a third message to a session management function, SMF, the third message indicating that the first SF is modifying packets in the session; receive from the SMF a fourth message, the fourth message comprising updated policy control rules for the session, wherein the updated policy control rules comprise an indication of a new SFC for the session; and move the session from the SFC to the new SFC, based on the received updated policy control rules.

According to a seventh aspect there is a computer program product comprising a computer readable medium, the computer readable medium having computer readable code embodied therein, the computer readable code being configured such that, on execution by a suitable computer or processor, the computer or processor is caused to perform the method of any embodiment of the first, second or third aspects.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

Figure 1A:
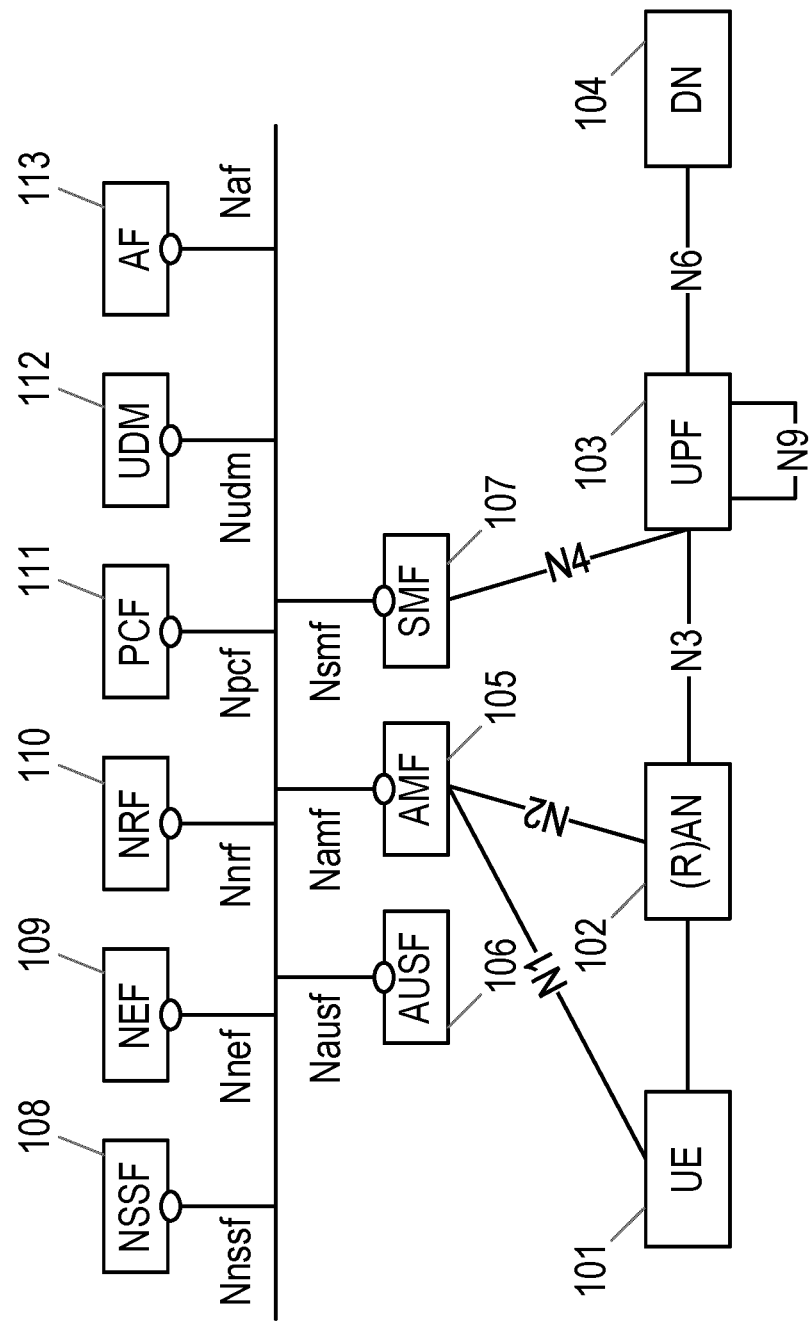
FIG. 1a shows a prior art 5G reference architecture relevant to some embodiments herein.

As described above, it is an object of embodiments herein to provide improved service function chain (SFC) management particularly where a service function (SF) in the service function chain needs to be modified (e.g. added, deleted or reconfigured). This may occur, for example, when packets belonging to a session that is served by a SFC are classified by a heuristic algorithm. Often a number of packets are transferred across the communications network using a (generic) service chain before the heuristic algorithm is able to properly classify the packets. The session may then need to be moved to a new SFC better able to handle, or optimised for, that packet type. If a SFC is terminated and the new SFC initiated as in current methods, then this can result in loss of TCP connection, affecting user experience. In particular, this occurs when one of the SFs in the SFC is modifying packets in the traffic. For example, a HTTP proxy opens a new connection to the destination server in behalf of client. This allows new HTTP headers to be inserted or the HTTP connection to be modified for optimisation (comprising payload, etc). With a http proxy module, the TCP connection that is seen by the destination server is different from TCP connection that is seen from the client. So, it is necessary to keep both TCP connections up and running to avoid impacting in client/destination experience. If HTTP proxy is destroyed, some other element else is needed to keep this TCP seq. number correlation between client/server to avoid impacting in both connections. In embodiments herein a new SF for the new SFC may be selected by a PCF so as to keep the TCP seq. number correlation between the client and server.

As will be explained in detail below, methods herein relate to moving a session from a service function chain (SFC) to a new SFC, wherein the SFC comprises a first SF that modifies packets in the session. Briefly, embodiments herein propose that responsive to determining to update a SF in the SFC for a session, the policy control function, PCF will determine a new SFC for the session comprising new SFs, wherein the new SFs are selected based on the determined update to the second SF and information related to the packet modification performed by the first SF. In other words, the PCF will preconfigure a new SFC that takes the packet modification into account, so as to provide a smooth transition and enable the session to be moved to the new SFC without disruption to the session.

By means of a summary, embodiments herein may comprise elements such as, for example: i) a registration procedure whereby each UPF 103 registers its SFs with the SMF, along with the capability each SF supports (e.g. firewalling, nat, etc.) and the SFs corresponding traffic behavior modification (e.g. in terms of proxy, address translation, stateful connections, etc.); ii) a session establishment procedure whereby at PDU session establishment, based on the traffic steering info, the SMF may decide how to change traffic when needed, based on the registered SF characteristics; iii) a service continuity indicator or profile whereby the UDR 114 may store (per service) a service continuity indicator for each user session (or type of user session) that describes how a session should be handled from a service continuity perspective; iv) the UPF 103 may inform the SMF of traffic modifications performed by a SF; v) the SMF may inform the PCF 111 about the modifications; vi) the PCF 111 may the update the forwarding policies (SFCs) to be activated in the UPF 103 on a per user and application basis, based on the traffic modifications done by UPF 103 and SFs for the session; and vii) the UPF 103 may divert traffic to a new SFC comprising the corresponding SFs without impacting traffic, in consideration of the reported traffic modifications. In examples where they are handled by the same SFF, including light SF and notifying the changes (for example the TCP state information for both connections, etc) applied using NSH. In examples where they are handled by different SFF, including light SF and notifying those changes using PFCP signalling.

In more detail, FIGS. 2-6 illustrate methods according to various embodiments herein for moving a session from a service function chain, SFC, to a new SFC, wherein the SFC comprises a first SF that modifies packets in the session. In other words, methods for managing SFs in a service function chain, without loss of TCP connection for a session associated with the SFC.

Figure 2:
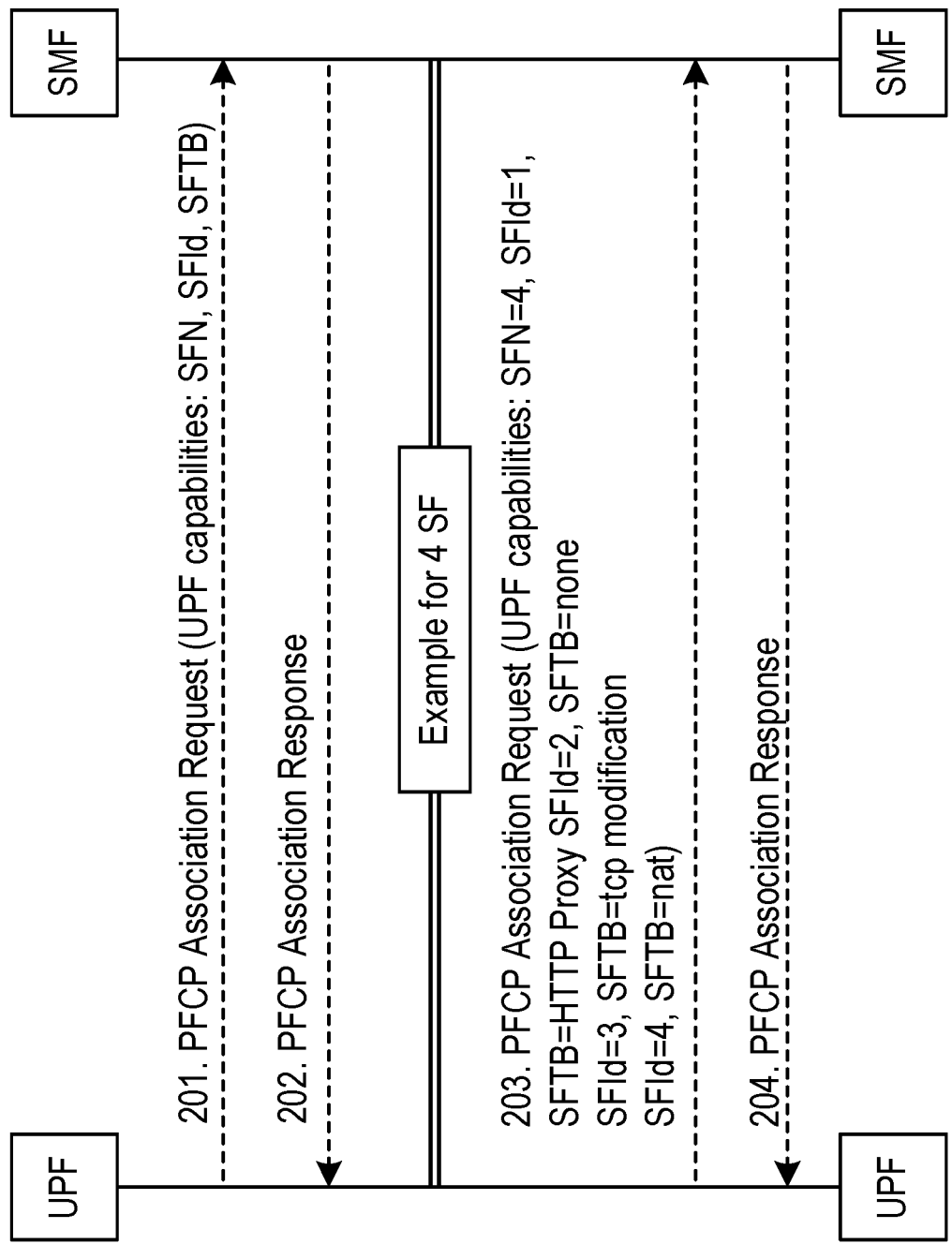
FIG. 2 shows an example signalling diagram according to some embodiments herein.

FIG. 2 illustrates a registration procedure between a UPF 103 and a SMF 107 for registering SFs of the UPF 103 with the SMF 107 according to some embodiments herein. The registration procedure gives the SMF 107 visibility of the SFs available to each UPF 103. This enables the SMF 107 to select an appropriate UPF 103 for a session (e.g. a UPF able to provide SFs needed for the session).

At 201 of the registration procedure, in FIG. 2, the UPF 103 sends a registration message to the SMF 107. The registration message comprises information to register one or more SFs associated with the UPF 103. For example, for each SF in the one or more SFs, the registration message may comprise i) an identifier for the respective SF and ii) an indication of any packet modifications performed by the respective SF. Additionally, the registration message may comprise a count of the one or more SFs to be registered. In the embodiment of FIG. 2, the registration message 201 comprises a PFCP association message. PFCP association message 201 comprises a list of tuples, each tuple comprising, for example, the following fields:

SFN: Number of Service Functions to be registered in the registration message

SF-ID—the identifier of a Service Function

Traffic behaviour Modification of SF associated with SF-ID—if SF modifies traffic behaviour (proxy, NAT, etc), if it is stateless/Stateful or nothing if there is no modification.

At 202, the SMF 107 sends a PFCP association response message to the UPF 103 to acknowledge signal 201 from the UPF 103.

In some embodiments, the existing PFCP association response message may be modified to comprise one or more of the following bits:

SFN: Number of possible Service Function included in UPF

SFId: Identifier of a Service Function included in UPF

SFTB: Traffic Behaviour of the Service Function corresponding to SFId.

An example PFCP Association Request according to some embodiments is illustrated in signal 203 of FIG. 2 which shows a PFCP Association request from a UPF having four SFs; a first with traffic behaviour of type "http proxy", a second with no traffic modification, a third with traffic behaviour of type "tcp modification" and a fourth with traffic behaviour of type network address translation "NAT". The SMF 107 may use registration messages of this type to select, from a plurality of UPFs, a UPF for a particular session.

A summary of User plane (UP) function features according to some embodiments herein is provided in Annex 1.

Figure 3:
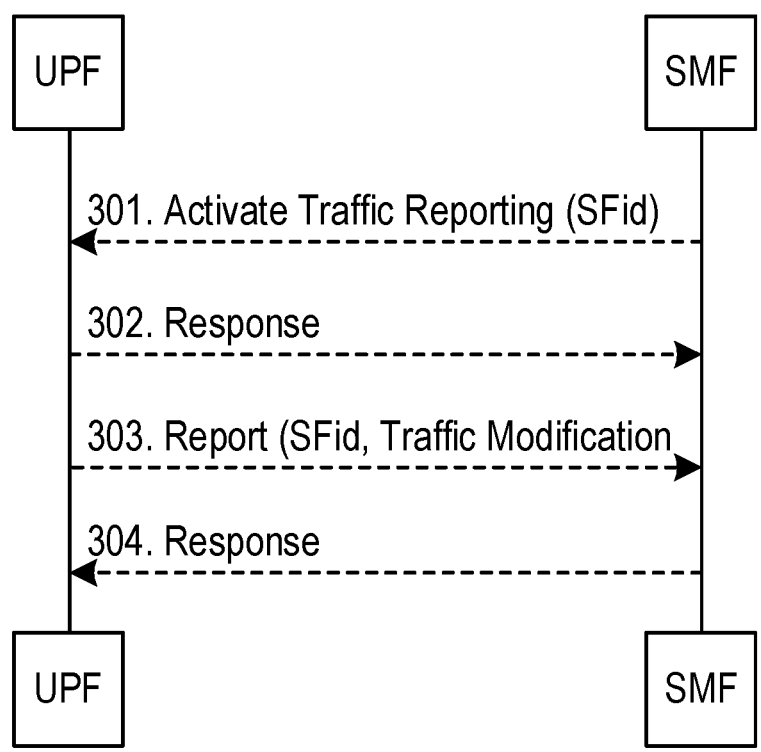
FIG. 3 shows an example signalling diagram according to some embodiments herein.

Turning now to FIG. 3, which illustrates how the SMF 107 may trigger reporting of traffic modifications performed by service functions according to some embodiments herein. In some embodiments, the SMF 107 sends a message 301 to the UPF 103, the message 301 comprising an instruction to the UPF 103 to commence SF Traffic behaviour reporting. The message 301 may comprise, for example, a list of target SF-IDs corresponding to SFs for which the UPF 103 should report on. The message 301 may further comprise an indication of a reporting trigger, for example, an indication of when the UPF 103 should provide the traffic behaviour reports. This may, for example, indicate that the traffic behaviour reports should be send e.g. periodically, after a predetermined time interval, etc. The message 301 may comprise a different reporting trigger for each SF-ID.

At 302 the UPF 103 acknowledges the subscription request. And at 303, in response to the message 301, the UPF 103 then sends the traffic behaviour modification report(s) to the SMF. The message 302 may comprise an indication that a SF is modifying packets in the session. The message 302 may comprise a list of SF-IDs and Traffic Modifications, for example the message 302 may comprise i) a 5 Tuple for the session, ii) a New 5 Tuple for the session iii) a TCP ACK Number for the session iv) a TCP Sequence Number for the session.

The SMF 107 can use this information to provide a smooth reselection/handover between SFCs when those chains are inter UPF. If the handover is intra UPF, the new UPF may be provided with all the information to provide a smooth re-selection/handover between SFCs.

Figure 4:
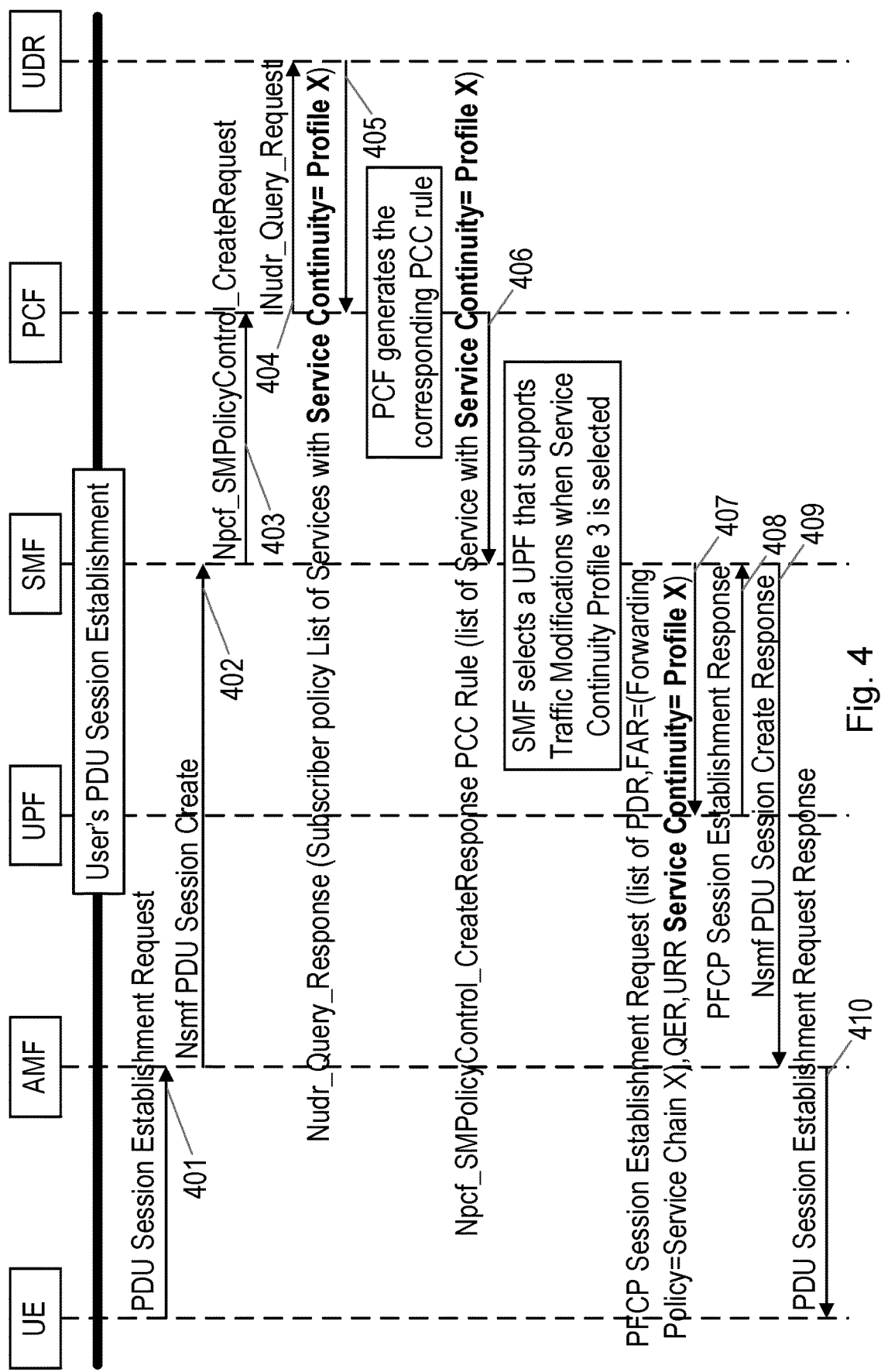
FIG. 4 shows an example signalling diagram according to some embodiments herein.

Turning now to FIG. 4, which illustrates a Session Establishment Procedure according to some embodiments herein. In some embodiments, the UDR 114 may be used to store information for each user and each application/session for each user, an indication of a service continuity level that should be applied to traffic for that user and/or application/session. The service continuity level may be used to determine how to manage a session associated with a SFC when a SF in the SFC needs to be modified. For example, whether it is appropriate to initiate a new SFC (e.g. according to prior art methods) or whether service continuity should be applied, e.g. whether SFC modification should be handled according to the methods described herein.

Thus, according to the embodiment of FIG. 4, a session may be established as follows. In signals 401-404, the UE (e.g. end user) makes a session Establishment Request 401 to the AMF which sends a Nsmf Session Create request 402 to the SMF. The SMF sends an Npcf_SMPolicyControl_CreateRequest 403 to the PCF. The PCF 111 then sends a Nudr_Query_Request 404 to the UDR 114. Signals 401 to 404 may be sent using standard messages.

In signal 405, the UDR 114 sends an indication of a service continuity indicator for the session to the PCF 111. The service continuity indicator may indicate, for example, one of the following levels of continuity for the service i) that the session can be restarted; ii) that the session can be broken and continued; or iii) that the session should be continuous.

In some embodiments, the UDR 114 may send the subscriber policy and the service continuity for each service to the PCF 111 in a Nudr_Query_Response message. A service continuity indicator in the Nudr_Query_Response message may indicate one of several profiles, for example, one of the following profiles:
Profile 1: No service continuity. In case there is an issue in the service, the session should be restarted from the beginning
Profile 2: Break and continue. The service can be broken and then it can be continued
Profile 3: Service Continuity. The service must be continuous, e.g. it cannot be broken.

At signal 406, the PCF 111 sends PCC Rules with the service continuity profile to the SMF 107. In this embodiment, if a session has a service continuity with profile 3 (Service Continuity) as above, the SMF 107 may then select a UPF for the session with Traffic Modification capacity, e.g. a UPF configured to perform the SFC modification procedure herein.

The SMF selects a UPF (with Traffic Behavior Modification and the corresponding enforcement actions: FARs, URRs, etc) for the PDU session. Specifically, SMF will provision the Service Continuity information (e.g. Profile 3). At signal 407, the SMF 107 signals the (selected) UPF, and sends the UPF 103 an indication of the service continuity profile for the session. In some embodiments, the service continuity profile is sent to the UPF 103 in a PFCP Session Establishment Request. In some embodiments, the PFCP protocol comprises an IE comprising the service continuity in the "PFCP Session Establishment/Modification Request". An example of how the PFCP Session Establishment/Modification Request could be modified to comprise the service continuity indicator is illustrated in Annex II. An example IE that may be used to transmit the service continuity profile is illustrated in Annex Ill.

In signal 408, the UPF 103 acknowledges the SMF request and in signals 409 and 410, the user session is established.

Thus in summary, using the methods outlined in FIGS. 2-4, a UPF may register its SFs with PCF and a service continuity profile may be saved in the UDR 114 for each user session. According to FIG. 4, when a set up procedure is initiated for a session, this enables the PCF to select an appropriate UPF for the session, taking the SFs required for the session and the continuity profile into account.

Figure 5A:
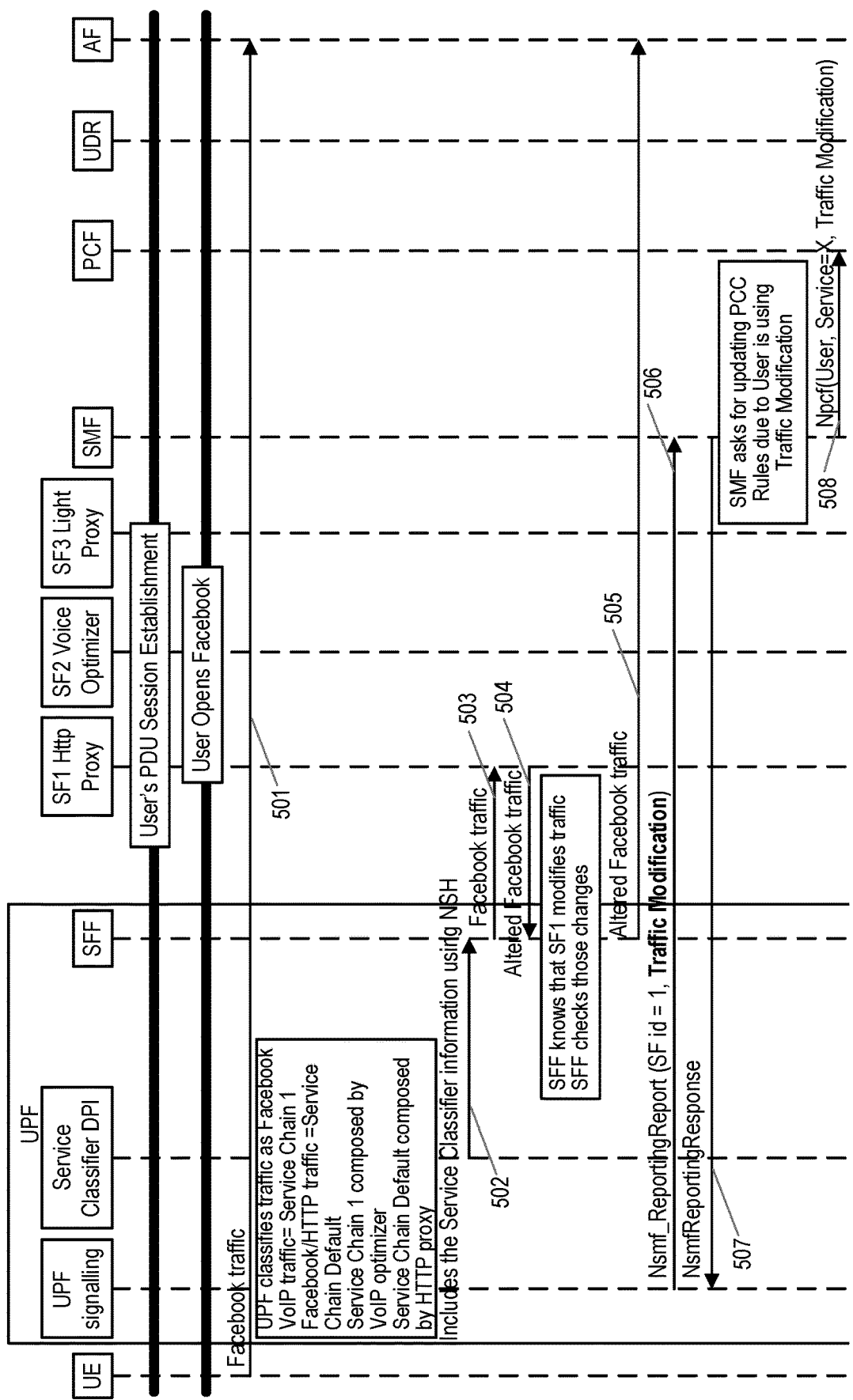
FIGS. 5a-c show an example signalling diagram according to some embodiments herein.
Figure 5B:
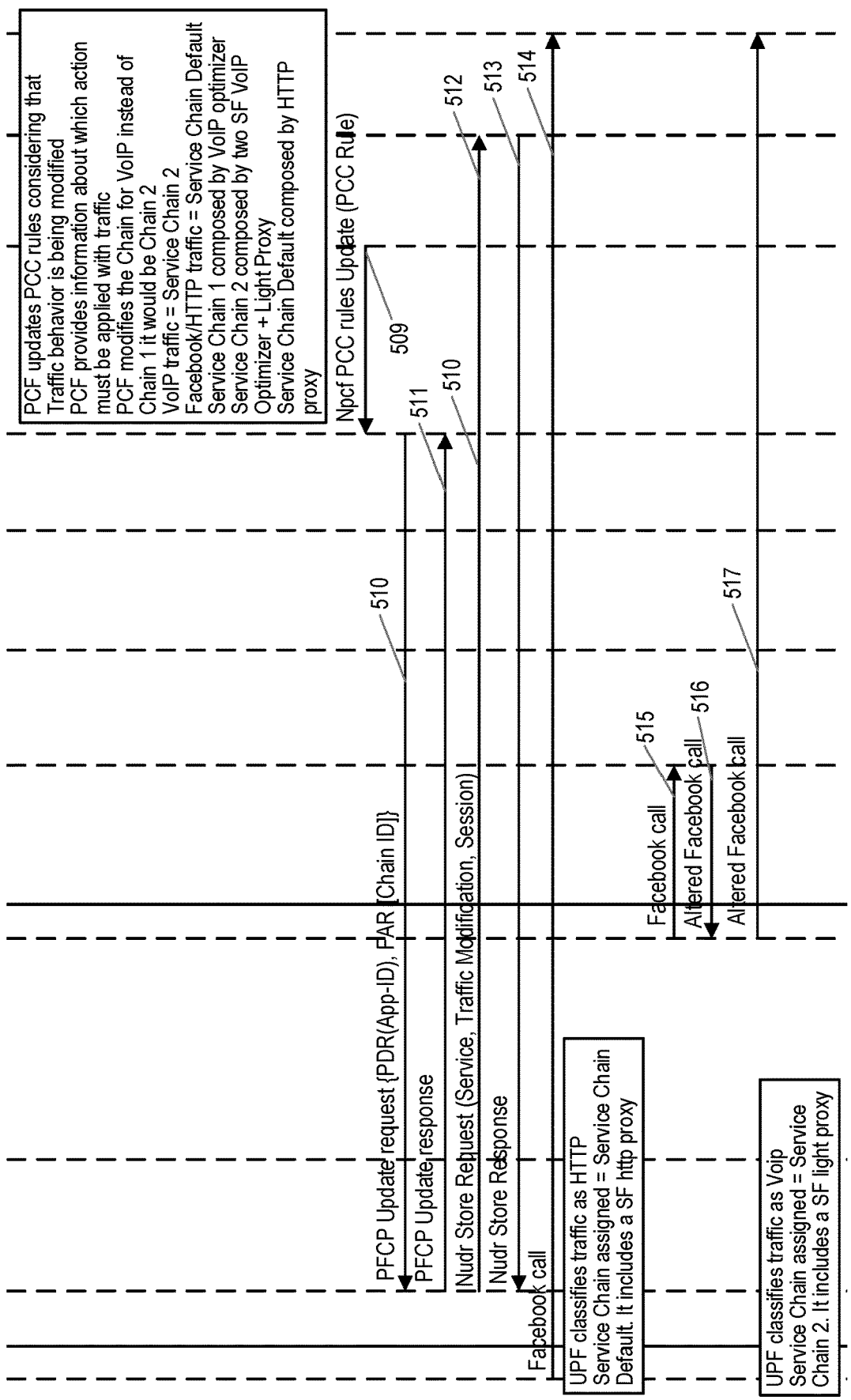
Figure 5C:
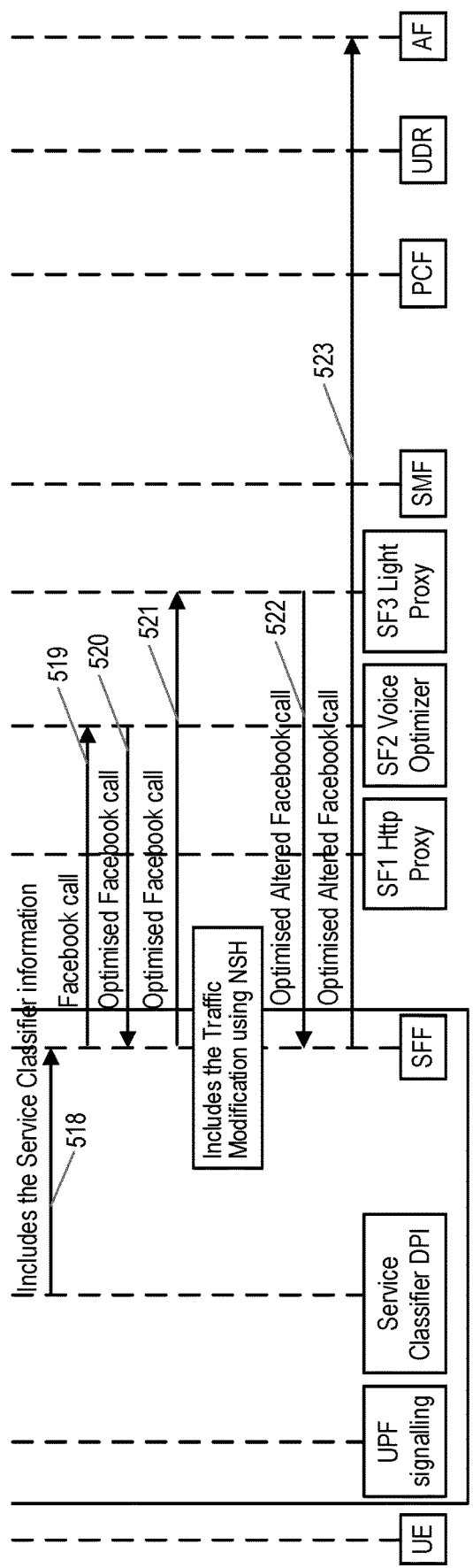

Turning now to FIGS. 5a-c which illustrate a method of moving a session comprising a facebook call from a default service function chain, SFC, to a new SFC "Service Chain 2", wherein the default SFC comprises a first SF "http proxy" that modifies packets in the session. The new SFC, "Service Chain 2" comprises new SFs, one of which is a light proxy which is added to account for the modification that was performed by the http proxy of the default SFC.

In FIGS. 5a-c the UPF is composed internally by:
A Service Function Forwarder (SFF): which is responsible for routing traffic between different SFs and includes metadata.
A Service Classifier (DPI): comprising a DPI engine which identifies traffic.
Signalling: able to handle PCFP connections towards SMF 107 and to sends reports towards SMF and UDR.

The skilled person will appreciate however, that this configuration is an example only and that these elements may be implemented in the UPF 103 or in other nodes.

The method of the embodiment illustrated in FIGS. 5a-c assumes that the UPF 103 has registered its SFs with the SMF, for example using the method described above with respect to FIG. 2. In FIG. 5a-c, the SMF requests UPF traffic modifications, for example, according to the method set out in FIG. 3. The SMF may be configured to request traffic modification information because, on session establishment, the SMF received an indication that the service continuity profile for the session should be "continuous" (e.g. Session Continuity for Services are Profile 3, as described above with respect to FIG. 4). In other words, in this embodiment, in signal 407 of FIG. 4, on session establishment, the SMF will send the following IE to the UPF:
Service Continuity Profile=Profile3

The UPF receives an indication of the SFC that should be used for the session, from the Forwarding Policy IE received from the SMF, and the UPF then routes the traffic to the corresponding chain.

In More Detail, the Signals in FIG. 5a Comprise:
501. User starts browsing by Facebook website.
502. Service Classifier (SC) identifies Facebook traffic as HTTP In this case, a default Service Chain is assigned to HTTP traffic. This default Service Chain is composed by a single Service Function that provides HTTP proxy functionality.

VoIP call are assigned to a Service Chain 1 that is composed by a voice optimizer.

SC routes the traffic to Service Function Forwarder (SFF) indicating a default Service Function Chain (SFC) using for example NSH.
503. Service Function (SF)1 is a HTTP proxy to optimize HTTP traffic (adding new HTTP headers or comprising HTTP content or optimizing TCP connection). SF1 will create a new TCP connection to HTTP server. SF1 will keep a TCP connection to user and another one to HTTP server. SF1 needs to save ACK numbers from user TCP connection to correlate them with new TCP connection. So, Facebook traffic is altered.

504. Modified Facebook traffic is sent to SFF. As SFF knows that SF1 modifies the traffic. SFF checks those changes in the traffic.
505. SFF sent traffic from SF1 to the Application Function (AF).
506. UPF reports the modification of traffic towards SMF according to procedure defined in FIG. 3 with the information provided in step 504 by SFF. During the whole end user session while traffic modification is still valid, UPF reports these modifications.
507. SMF answers to the previous reporting of UPF
508. SMF asks to PCF for new PCC Rules due to the fact that there is traffic modification in some services. SMF consolidates per service those traffic modifications in each SF. SMF sent towards PCF information about the Service that is matched, and the traffic modification done.

The method is continued in FIG. 5b. The signals in FIG. 5b comprise:

509. PCF answers with new PCC rules. In this example, PCF decides to modify the Service Chain that are included in the Forwarding Policies in the FAR per each PDR
   a. VoIP traffic is going to be routed to Service Chain 2 instead of Service Chain 1 provisioned at the session establishment. Service Chain 2 is composed by VoIP optimizer (included in Service Chain 1) and a light proxy that will modify traffic in a similar way as http proxy but without including http modifications. It includes TCP proxy
   b. HTTP traffic is going to be routed as Default Service Chain as in the initial session establishment
510. SMF updates with new PDR rules to UPF.
511. UPF answers that it has received correctly the rules indicated by SMF
512. Optionally, UPF using SBA interfaces stores periodically the flow information modification towards UDR. In case there is an UPF reselection, the new UPF can retrieve this information from UDR. If there is no UPF reselection, UPF does not need to check the UDR for looking to this information because it is stored locally in the UPF.
513. UDR answers that the operation has been done.
514. End user starts a Facebook call (i.e. a facebook session). The Service Classifier classifies the traffic as HTTP. Traffic is routed to a SFC that is a default SFC for http traffic, according to PDR rules.
515. SFF sends to SF1 the Facebook call.
516. SF1 modifies the Facebook call traffic according to what is defined in HTTP proxy. So, traffic is modified. Traffic is sent to the SFF. SFF monitors how traffic is modified due to the presence of HTTP proxy.
517. SFF sends traffic to AF.

The method is continued in FIG. 5c. The signals in FIG. 5c comprise:

518. After a number of packets are sent via the default SFC, a heuristic classifier determines that these TCP connections are a Facebook VoIP call based on heuristic analysis. UPF follows PDR rules sent by SMF. In this case, SMF following PCC rules (modified due to the reports sent in step 516) determines that the session needs to be moved to a new SFC "Service chain 2", e.g. that the Facebook call should go first to Voice optimizer and then to the light proxy (due to initial connection was to HTTP proxy and for not resetting the established connection). So, the UPF needs to divert these TCP connections to the new SFC with SF2 to optimize voice quality (for example). The PCF preconfigured the new SFC (Service Chain 2) with a SF comprising a light proxy which will maintain the same correlation between TCP ACK number from user and from HTTP server in order to avoid dropping TCP connection. This is done transparently to the user. This SF proxy is not a copy of SF1 because it will not modify the HTTP traffic anymore. It has been created to make sure TCP ACK numbers consistency between user connection and HTTP destination server. Classifier routes the traffic to Service Function Forwarder (SFF) indicating a Service Function Chain (SFC) 2 using for example a NSH.
519. SFF sends traffic to Voice Optimizer. Voice Optimizer performs the needed actions over the traffic.
520. Voice Optimizer sends traffic to SFF.
521. SFF sends traffic to Light Proxy. SFF includes using NSH the traffic modifications detected previously. Light Proxy reads from NSH the modifications needed for those flows and applies to the traffic. Note: SFF sends always those modifications when the SF is the Light Proxy.
522. Light Proxy sends the traffic to SFF.
523. SFF sends to the application function.

In this manner, the session (facebook VoIP call) is moved from a (default) SFC to a new SFC (service chain 2) without dropping TCP connection. The default SFC comprised a first SF "http proxy" that modified packets in the session. An update is determined whereby a second SF "SF 2 voice optimizer" needs to be added to the SFC serving the session. Thus a new SFC is configured comprising new SFs including the second SF "SF 2 voice optimizer" and a light proxy SF3 which is added in view of the modification that was made to traffic packets by the http proxy in the default SFC.

Figure 6A:
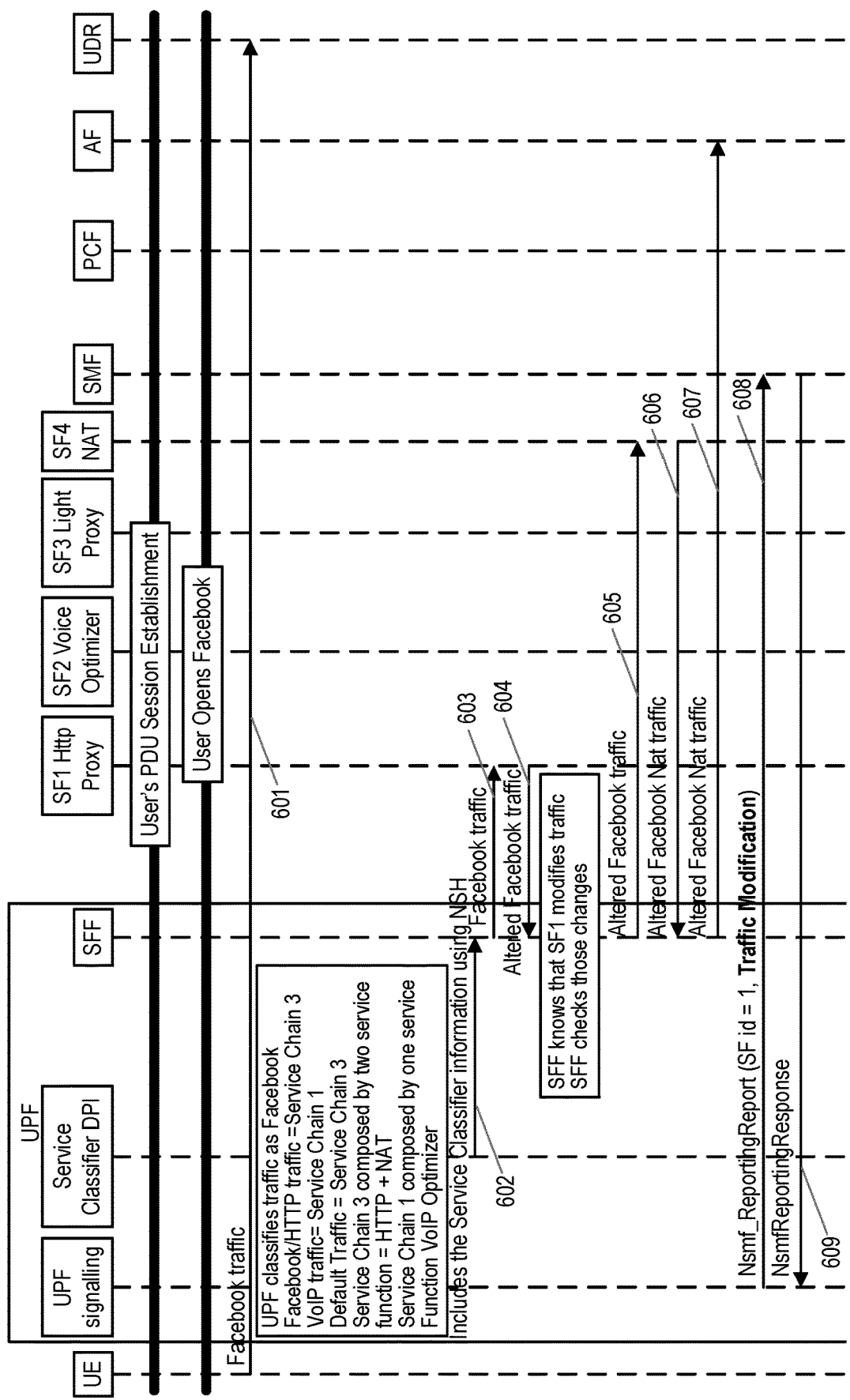
FIGS. 6a-c show an example signalling diagram according to some embodiments herein.
Figure 6B:
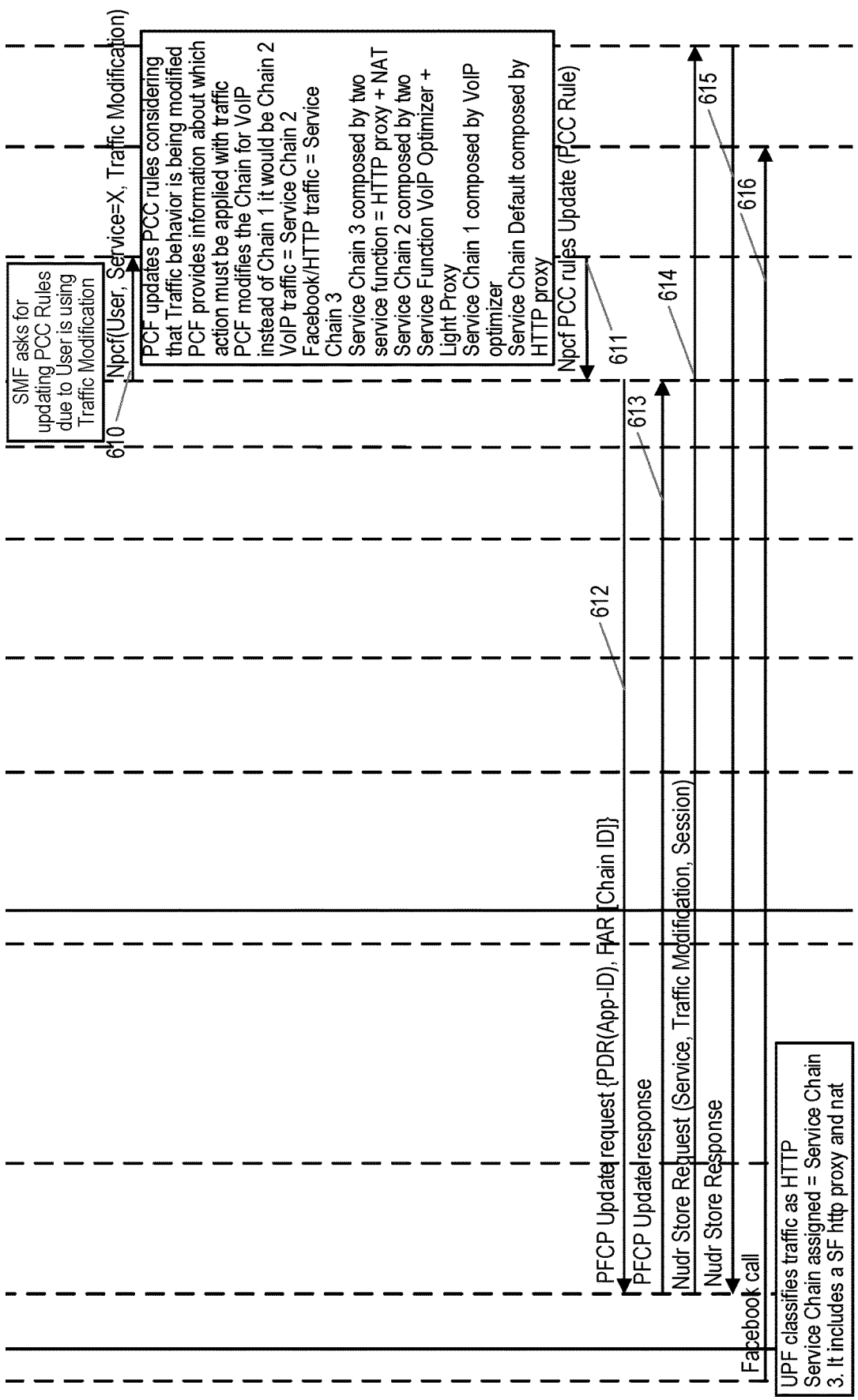
Figure 6C:
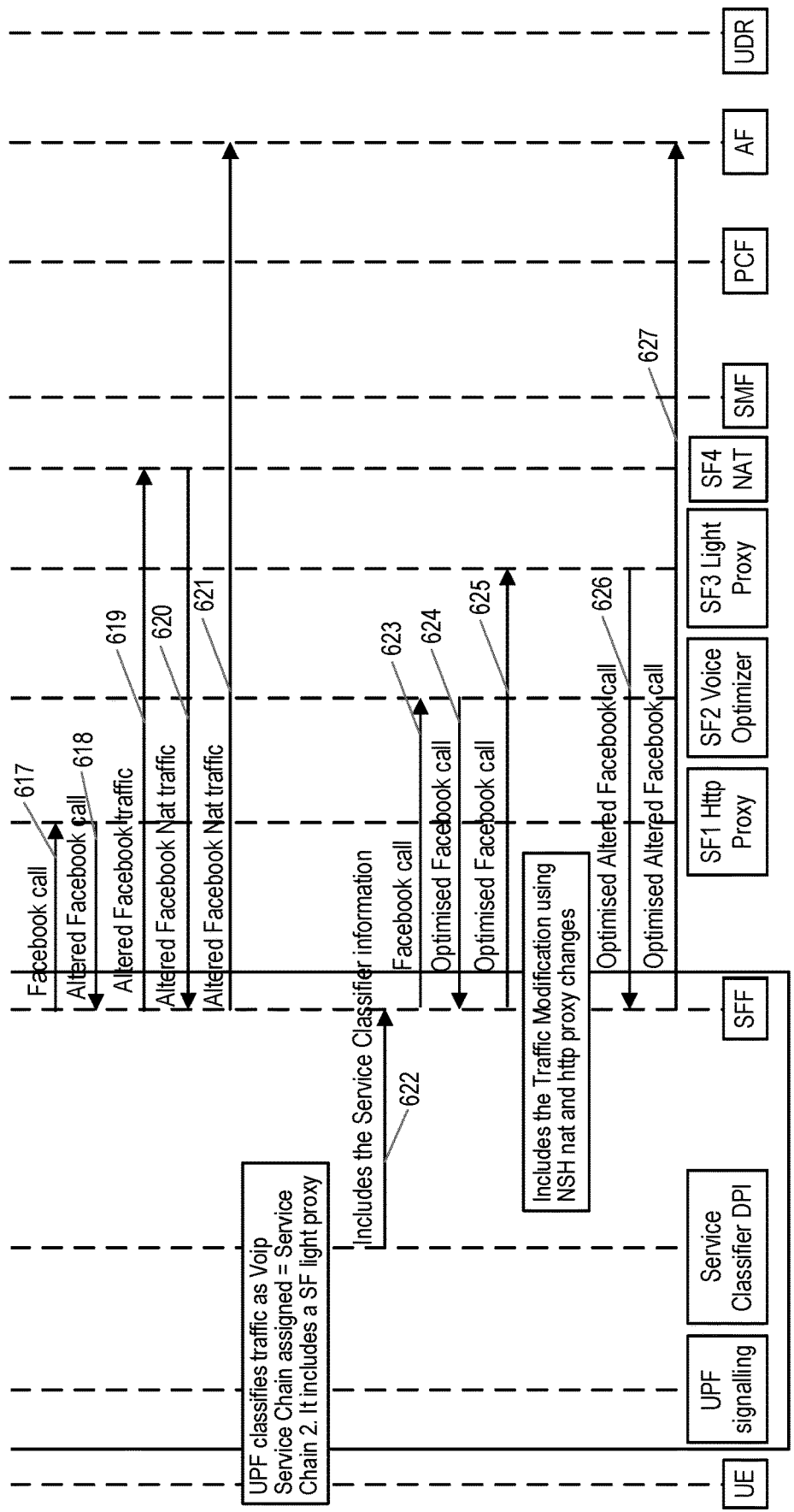

Turning now to FIGS. 6a-c which illustrate an example embodiment whereby a facebook session (facebook call initiated in signal 16 as described below) is initially served by a default SFC that comprises two SFs that modify packets in the session a first SF labelled "SF4 NAT" and a third SF labelled "SF1 HTTP proxy". After heuristic analysis is performed, the UPF classifies the facebook session as VoIP, and the traffic is moved to a new SFC "Service Chain 2". The new SFC comprises new SFs-"SF2 Voice Optimizer" and a light proxy which compensates for the traffic modifications performed by the first SF and third SF in the default SFC.

The method of the embodiment illustrated in FIGS. 6a-c assumes:

UPF has registered its SF towards SMF according to FIG. 2.

SMF asks for UPF traffic modifications according to FIG. 3. SMF asks for those traffic modifications due to Session Continuity for Services being Profile 3, following FIG. 4. So, in step 407 in FIG. 4, SMF will send the following values: Service Continuity Profile=Profile 3.

UPF receives the chain from the Forwarding Policy IE from SMF. UPF routes the traffic to the corresponding chain.

In more detail, the signals in FIG. 6a comprise:

601. User starts browsing by Facebook website.

602. Service Classifier (SC) identifies Facebook traffic as HTTP.

In this case, Service Chain 3 is assigned to HTTP traffic. This default Service Chain is composed by two Service Functions that provides HTTP proxy and NAT functionality. VoIP call are assigned to a Service Chain 1 that is composed by a voice optimizer.

603. SC routes the traffic to Service Function Forwarder (SFF) indicating the Service Function Chain (SFC) 3 using for example NSH Service Function (SF)1 is a HTTP proxy to optimize HTTP traffic (adding new HTTP headers or comprising HTTP content or optimizing TCP connection). SF1 will create a new TCP connection to HTTP server. SF1 will keep a TCP connection to user and another one to HTTP server. SF1 needs to save ACK numbers from user TCP connection to correlate them with new TCP connection. So, Facebook traffic is altered.

604. Modified Facebook traffic is sent to SFF. As SFF knows that SF1 modifies the traffic. SFF checks those changes in the traffic.

605. SFF sent traffic towards the next element in the Chain. In this case the Service Function of NAT. SF changes the IP address.

606. SF of NAT sends the traffic back to SFF.

607. SFF sent traffic to the Application Function (AF). As SFF knows that this chain modifies traffic characteristics, SFF tracks those changes. So, it tracks how traffic is altered.

608. UPF reports the modification of traffic towards SMF according to procedure defined in FIG. 3 with the information provided in step 604 by the SFF. During the whole end user session while traffic modification is still valid, UPF reports these modifications.

609. SMF answers to the previous reporting of UPF.

The method is continued in FIG. 6b. The signals in FIG. 6b comprise:

610. SMF asks to PCF for new PCC Rules due to the fact that there are traffic modifications in some services. SMF consolidates per service those traffic modifications in each SF. SMF sent towards PCF information about the Service that is matched, and the traffic modification done.

611. PCF answers with new PCC rules. In this example, PCF decides to modify the Service Chain that are included in the Forwarding Policies in the FAR per each PDR:
   a. VoIP traffic is going to be routed to Service Chain 2 instead of Service Chain 1 provisioned at the session establishment. Service Chain 2 is composed by VoIP optimizer (included in Service Chain 1) and a light proxy that will modify traffic in a similar way as http proxy but without including http modifications. This light proxy is another SF that are in the system. It only modifies TCP protocol.
   b. HTTP traffic is going to be routed as Service Chain 3 as in the initial session establishment.

612. SMF updates with new PDR rules to UPF.

613. UPF answers that it has received correctly the rules indicated by SMF.

614. Optionally, UPF using SBA interfaces store periodically the flow information modification towards UDR. In case there is an UPF reselection, the new UPF can retrieve this information from UDR. If there is no UPF reselection, UPF does not need to check the UDR for looking to this information because it is stored locally in the UPF.

615. UDR answers that the operation has been done.

616. End user starts a Facebook call. Service Classifier classifies traffic as HTTP. Traffic is routed to Service Chain default according to PDR rules.

The method is continued in FIG. 6c. The signals in FIG. 6c comprise:

617. SFF sends to SF1 the Facebook call

618. SF1 modifies the Facebook call traffic according to what is defined in HTTP proxy. So, traffic is modified. Traffic is sent to the SFF. SFF monitors how traffic is modified due to the presence of HTTP proxy.

619. SFF sends traffic to the NAT Service Function.

620. SF of NAT sends the traffic back to SFF.

621. SFF sent traffic to the Application Function (AF). As SFF knows that this chain modifies traffic characteristics, SFF tracks those changes. So, it monitors how traffic is altered.

622. After a number of packets are sent via the default SFC, a heuristic classifier determines that these TCP connections are a Facebook VoIP call based on heuristic analysis. UPF follows PDR rules sent by SMF. In this case, SMF following PCC rules (modified due to the reports sent in step 606) determines that the session needs to be moved to a new SFC "service chain 2" that Facebook call must go first to Voice optimizer and then to the light proxy (due to initial connection was to HTTP proxy and for not resetting the established connection. So UPF needs to divert these TCP connections to other SFC with SF2 to optimize voice quality (for example). SF with light proxy will keep same correlation between TCP ACK number from user and from HTTP server to avoid dropping any TCP connection. This is done transparently to the user. This SF proxy is not a copy of SF1 because it will not modify the HTTP traffic anymore. It has been created to make sure TCP ACK numbers consistency between user connection and HTTP destination server. Classifier routes the traffic to Service Function Forwarder (SFF) indicating a Service Function Chain (SFC) 2 using, for example, NSH.

623. SFF sends traffic to Voice Optimizer. Voice Optimizer performs the needed actions over the traffic.

624. Voice Optimizer sends traffic to SFF.

625. SFF sends traffic to Light Proxy. SFF includes using NSH the traffic modifications detected previously. Light Proxy reads from NSH the modifications needed for those flows and applies to the traffic. In this case it applies the changes performed by the HTTP proxy in terms of TCP sequence number and NAT in terms of Ip address changes. Note: SFF sends always those modifications when the SF is the Light Proxy.

626. Light Proxy sends the traffic to SFF.

627. SFF sends to the application function.

When there is a UPF reselection, the new UPF, using the flow information stored in the UDR can maintain the changes performed in the traffic from the other UPF.

Figure 7:
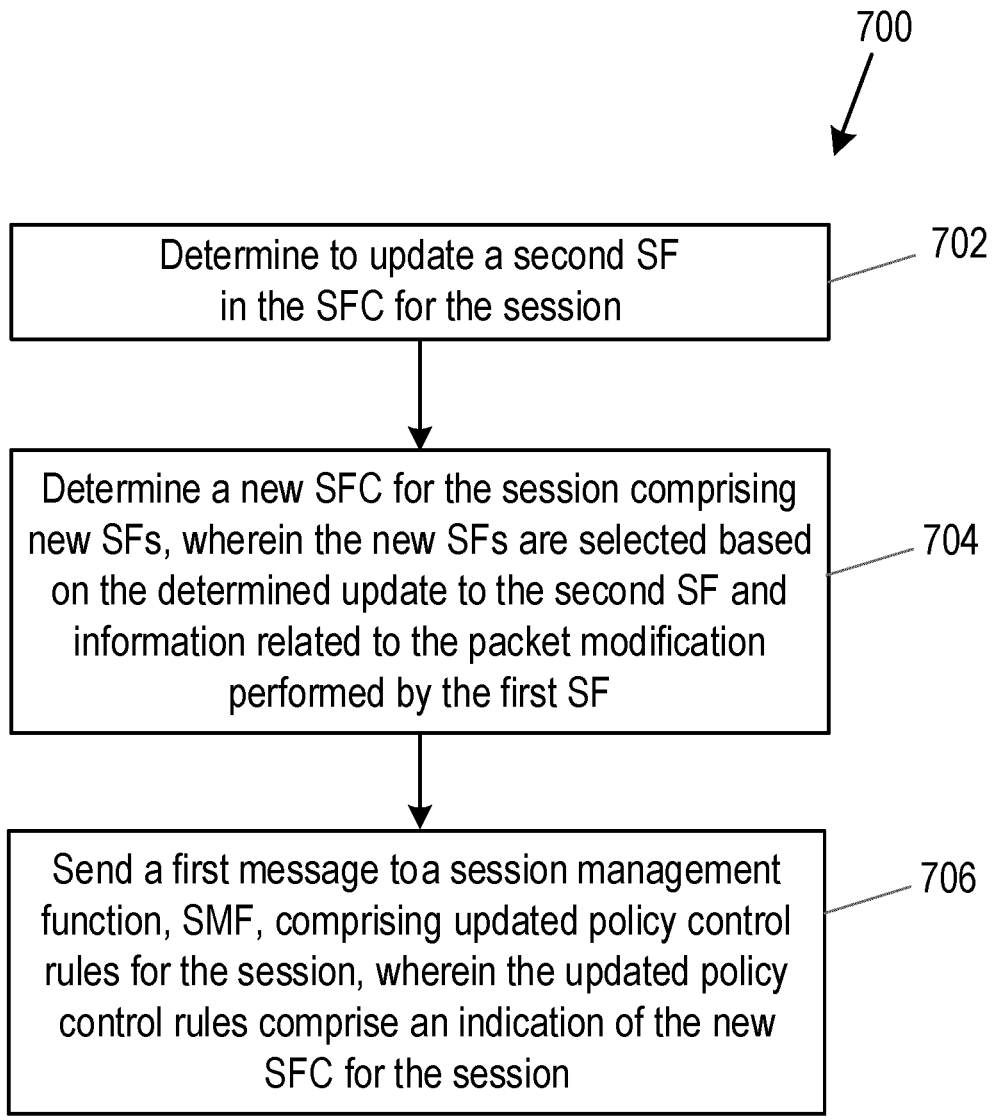
FIG. 7 shows an example method in a Policy Control Function according to some embodiments herein.
Figure 8:
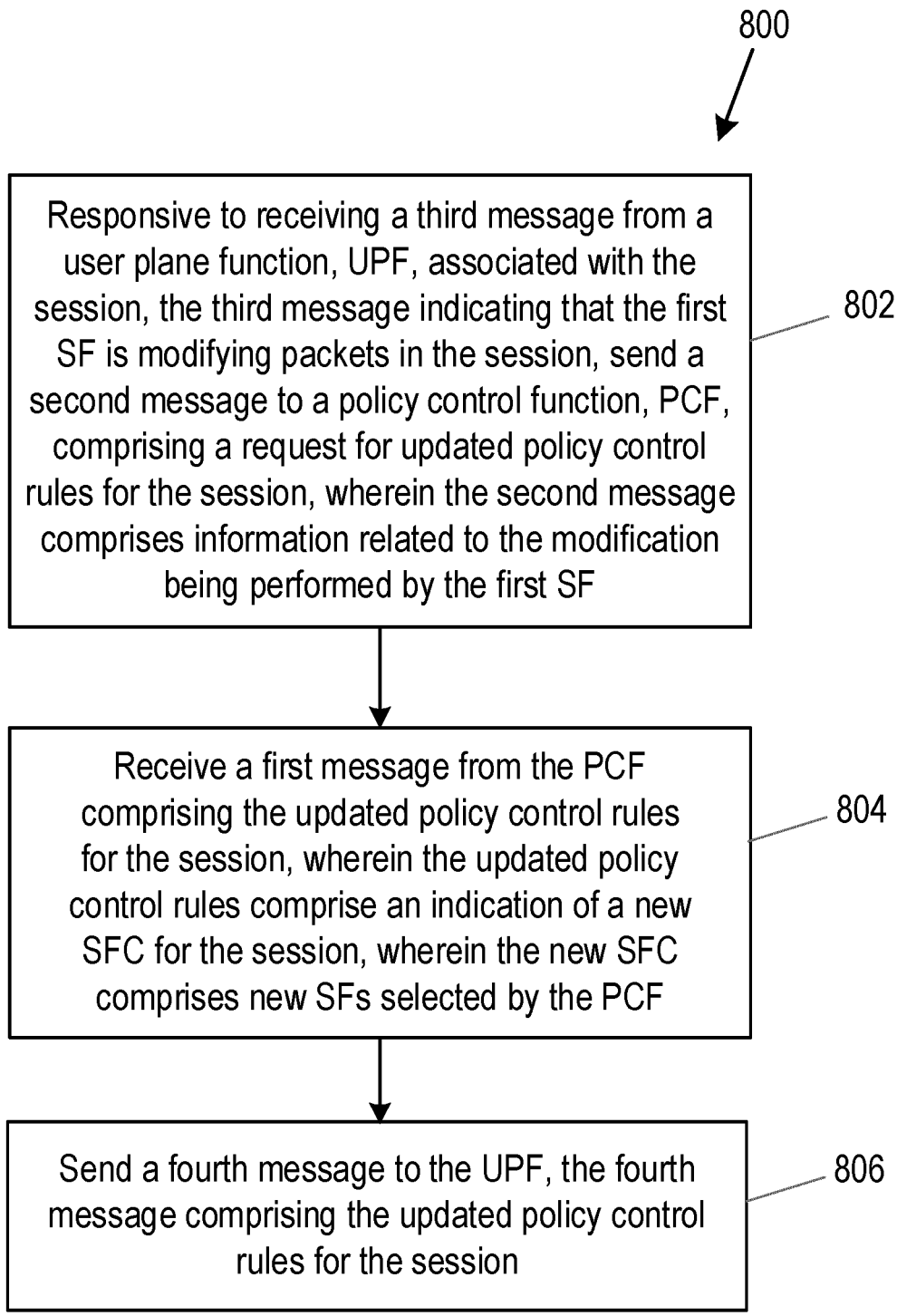
FIG. 8 shows an example method in a Session Management Function according to some embodiments herein.
Figure 9:
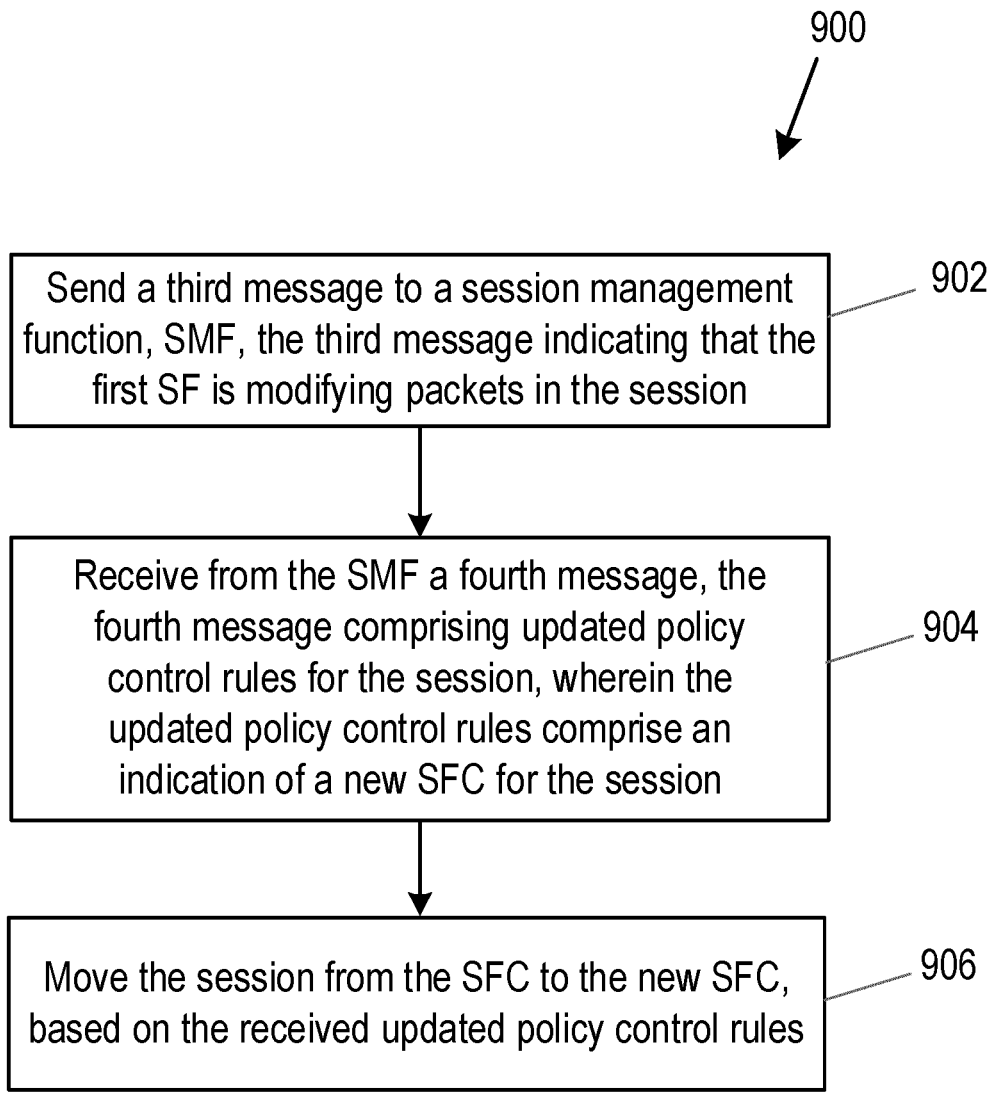
FIG. 9 shows an example method in a User Plane Function according to some embodiments herein.

Turning now to other embodiments, FIGS. 7-9 illustrate methods in various network function (NF) nodes of a communications network according embodiments herein.

Generally, a communications network (or telecommunications network) may comprise any type of communications network, for example, the communications network may comprise and/or interface with any type of communication, telecommunication, data, cellular, and/or radio network or other similar type of system. In some embodiments, the communications network may be configured to operate according to specific standards or other types of predefined rules or procedures. Thus, in some embodiments, the communications network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

The communications network may comprise or interface with one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Figure 1B:
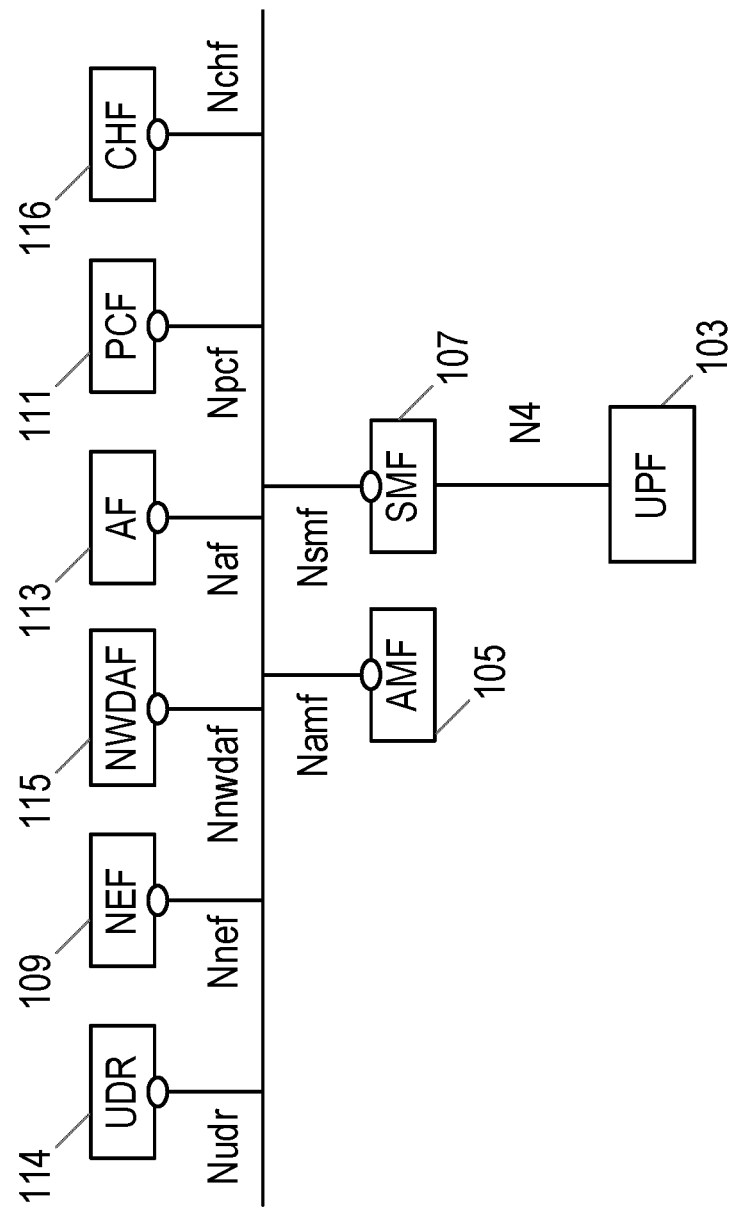
FIG. 1b shows a prior art 3GPP 5G core (5GC) architecture for policy, charging and analytics relevant to some embodiments herein.

The functionality of parts of the communications network may be divided into functions, such as the functions briefly described in the background section and FIGS. 1a and 1b above. Briefly, a function comprises a functional building block with well-defined functional behaviors and external interfaces. Functions may be implemented in hardware or software, for example in a service based architecture. Functions may further be implemented in a distributed or cloud-based manner.

Generally, the method 700 as shown in FIG. 7 may be performed by a function of the communications network. For example, in some embodiments the method 700 may be performed by a policy control function, PCF. It will be appreciated that generally a function may comprise (or be comprised on) any network node, processing circuitry, virtual machine or other software or computational arrangement suitable for performing the function. Furthermore, it will be appreciated that other functions or nodes (e.g. having similar functionality to a PCF) may also perform the method 700 or parts of the method 700 thereof.

In some embodiments, the PCF may comprise the PCF as illustrated in any of FIGS. 4. 5a-c or 6a-c and it will be appreciated that the functionality described therein applies equally to the method 700.

In more detail, the method 700 comprises a method in a policy control function, PCF, of moving a session (e.g. a traffic stream associated with a user application) from a SFC to a new SFC, wherein the SFC comprises a first SF that modifies packets in the session. In a first block 702 the method 700 comprises determining to update a second SF in the SFC for the session. In a second block 704, the method 700 comprises determining a new SFC for the session comprising new SFs, wherein the new SFs are selected based on the determined update to the second SF and information related to the packet modification performed by the first SF. In a third block 706, the method 700 comprises sending a first message to a session management function, SMF, comprising updated policy control rules for the session, wherein the updated policy control rules comprise an indication of the new SFC for the session.

In block 702, determining to update a second SF in the SFC for the session, may comprise determining to add, modify, delete, or replace the second SF in the service function chain.

In block 704, the method 700 comprises determining a new SFC for the session (e.g. to accommodate or initiate the update to the second SF), the new SFC comprising new SFs, wherein the new SFs are selected based on the determined update to the second SF and information related to the packet modification performed by the first SF. For example, the PCF may determine that the first SF will not be included in the new SFC, and/or that the second SF may be included instead of the first SF. In such embodiments, a compensatory SF may also be added as one of the new SFs, wherein the compensatory SF is selected, or configured to ensure TCP ACK number consistency between the SFC and the new SFC in view of the packet modification performed by the first SF in the SFC.

This was described above, for signal 518 of FIG. 5c whereby a compensatory SF comprising a light proxy was added to the new SFC (SFC 2 of FIG. 5) to compensate for removal of the first SF comprising the http proxy that was removed from the (default) SFC.

Thus, in some embodiments, the first SF may comprise a server proxy, such as a http proxy and one of the new SFs may comprise a light proxy. In some embodiments, the first SF may comprise a NAT and one of the new SFs may comprise a light proxy. In other words, a light proxy may be used to compensate for removal of a SF that modifies traffic in a session without losing TCP connection.

In some embodiments, a new SF for the new SFC may be selected by a PCF so as to keep the TCP seq. number correlation between the client and server.

In some embodiments, a network address translation NAT SF may be used, to perform remapping of a first IP to a second IP. In such an embodiment, the NAT server needs may save both IPs to maintain TCP connections.

In block 706 a first message is sent to the session management function, SMF 107, comprising updated policy control rules for the session. The updated policy control rules comprise an indication of the new SFC for the session. Examples of the first message were described with respect to signals 509 of FIG. 5b and 611 of FIG. 6b above and the detail therein will be understood to apply equally to block 706.

In some embodiments, the method 700 may be performed responsive to receiving a second message from the SMF 107 comprising a request for updated policy control rules for the session, wherein the second message further comprises the information related to the packet modification performed by the first SF. The second message may comprise, for example, signal 508 of FIG. 5a or signal 610 of FIG. 6b as described above and the detail therein will be understood to apply equally to the method 700 herein.

In some embodiments, the method 700 may be performed responsive to receiving a service continuity indicator for the session wherein the service continuity indicator indicates that the session should be maintained (for example, that the session is "Profile 3" as described above).

In some embodiments, the service continuity indicator may be obtained by the PCF from a unified data repository, UDR, as part of a session establishment procedure for the session, for example, according to signal 405 of FIG. 4 described above.

Turning now to FIG. 8, which illustrates a method 800 in a session management function, SMF 107. Generally, the method 800 as shown in FIG. 8 may be performed by a function of the communications network. For example, in some embodiments the method 800 may be performed by a session management function or any other network function node configured to manage sessions in a communications network. It will be appreciated that generally a function may comprise (or be comprised on) any network node, processing circuitry, virtual machine or other software or computational arrangement suitable for performing the function.

Furthermore, it will be appreciated that other functions or nodes (e.g. having similar functionality to a SMF) may also perform the method 800 or parts of the method 800 thereof.

In some embodiments, the SMF 107 may comprise the SMF 107 as illustrated in any of FIGS. 2, 3, 4, 5*a-c* or 6*a-c* and it will be appreciated that the functionality described therein applies equally to the method 800.

Briefly, the method 800 comprises a method of moving a session associated with an SFC to a new SFC, whereby the SFC comprises a first SF that modifies packets in the session. In a first block 802 the method 800 comprises, responsive to receiving a third message from a user plane function, UPF, 103 associated with the session, the third message indicating that the first SF is modifying packets in the session, sending a second message to a policy control function, PCF, 111 comprising a request for updated policy control rules for the session, wherein the second message comprises information related to the modification being performed by the first SF. In a second block 804, the method comprises receiving a first message from the PCF 111 comprising the updated policy control rules for the session, wherein the updated policy control rules comprise an indication of a new SFC for the session, wherein the new SFC comprises new SFs selected by the PCF 111. In a third block 806, the method comprises sending a fourth message to the UPF 103, the fourth message comprising the updated policy control rules for the session.

In more detail, in block 802, the third message may comprise a message such as signal 303 in FIG. 3, signal 506 in FIG. 5*a*, or 608 in FIG. 6*a*. In some embodiments, the third message may thus comprise a Nsmf_ReporingReport message, as described above. In some embodiments, the third message may comprise one or more of a 5 tuple for the session; a new 5 tuple for the session; a TCP ACK number for the session; and a TCP Sequence number for the session. The SMF can use such information to provide a smooth handover from the SFC and the new SFC.

In some embodiments, the SMF 107 triggers the UPF 103 to commence traffic modification reporting. In other words, the method 800 may further comprise (e.g. preceding steps 802, 804 and 806) the SMF 107 sending a fifth message to the UPF 103, the fifth message comprising an instruction to the UPF 103 to commence SF Traffic behaviour reporting. The fifth message may be sent (e.g. traffic modification reporting may be initiated) in response to the SMF 107 receiving a service continuity indicator for the session (e.g. of "profile 3"), as described below. The fifth message may comprise, for example, a message such as the signal 301 in FIG. 3 as was described above. In some embodiments, the third message is therefore received from the UPF 103 in response to the fifth message.

In block 802, the SMF 107 sends a second message to a policy control function, PCF, comprising a request for updated policy control rules for the session. The second message comprises information related to the modification being performed by the first SF. In some embodiments, the second message may comprise a message such as signal 508 in FIG. 5*a* above, or signal 610 of FIG. 6*b*. In some embodiments, the second message may comprise a Npcf message, for example.

In 804, the SMF 107 receives a first message from the PCF 111, comprising the updated policy control rules. In some embodiments, the first message may comprise the first message as described with respect to block 706 FIG. 7 as described above. Examples of the first message were described with respect to signals 509 of FIG. 5*b* and 611 of FIG. 6*b* above and the detail therein will be understood to apply equally to block 804.

In block 806, the SMF 107 sends a fourth message to the UPF 103 comprising updated policy control rules for the session. The fourth message in block 806 may comprise, for example, signal 510 of FIG. 5*b* or signal 612 of FIG. 6*b* as described above. Thus, in some embodiments, the fourth message may comprise a PFCP update request, comprising an app-ID and SFC ID that is to serve the session.

In some embodiments, the step of sending 806 a fourth message to the UPF 103, the fourth message comprising the updated policy control rules for the session may further comprise: determining one or more detection rules (e.g. PDRs) and/or instruction rules (for example, such as different enforcement actions, e.g. traffic steering, QoS, Charging/Reporting through FARs, QERs, and/or URRs) based on the updated policy control rules for the session wherein at least one instruction rule comprises an indication of the new SFC; and sending the one or more detection rules and/or instruction rules to the UPF 103 in the fourth message.

The SMF 107 may also be involved in a registration procedure, such as was described with respect to FIG. 2 above whereby a UPF 103 may register its SFs with the SMF 107. For example, in some embodiments, the method 800 may further comprise (e.g. preceding blocks 802-806) receiving registration messages from a plurality of UPFs. Each registration message comprising registration information to register one or more SFs associated with the UPF, the registration information comprising: for each SF in the one or more SFs, i) an identifier for the respective SF and ii) an indication of any packet modifications performed by the respective SF. Each registration message may comprise a message such as the signal 201 or 203 of FIG. 2 above. For example, in some embodiments, each registration message comprises a PFCP Association Request. The PFCP Association request may, for example, be in the format shown in Annex I which describes different Octet/Bits corresponding to different indications of supported features. PFCP association request could reuse this to indicate that it is allowed in UPF.

In some embodiments, the method 800 may comprise determining a UPF for a session. For example, the SMF 107 may determine an appropriate UPF for the session as part of a session establishment procedure. The SMF 107 may use the registration messages described above, to select, from a plurality of UPFs, the UPF to associate with the session. In some embodiments, the method 800 may comprise receiving from the PCF 111, as part of a session establishment procedure for the session, an indication of a service continuity indicator for the session. As described above, the service continuity indicator may indicate one of the following: that the session can be restarted; that the session can be broken and continued; or that the session should be continuous. The service continuity indicator may be obtained, for example, from the PCF 111 (via the UDR) according to signal 406 of FIG. 4. The method 800 may further comprise sending the service continuity indicator to the UPF 103 associated with the session in a PFCP Session Establishment Request or a PFCP Session Modification Request as part of a session establishment procedure for the session. This was illustrated above in signal 407 of FIG. 4. A possible format of such a PFCP Session Establishment Request or a PFCP Session Modification Request according to some examples herein is given in Annex II.

The SMF 107 may use the service continuity indicator when selecting a UPF 103 for the session. For example, if the service continuity indicator indicates that that the session should be continuous, the method 800 may comprise selecting, from the plurality of UPFs, a UPF with traffic modification capability as the UPF associated with the session.

Turning now to FIG. 9, there is a method in a user plane function, UPF, according to some embodiments herein. Generally, the method 900 as shown in FIG. 9 may be performed by a function of the communications network. For example, in some embodiments the method 900 may be performed by a user plane function or any other network function node which performs functions similar to a user plane function. It will be appreciated that generally a function may comprise (or be comprised on) any network node, processing circuitry, virtual machine or other software or computational arrangement suitable for performing the function. Furthermore, it will be appreciated that other functions or nodes (e.g. having similar functionality to a UPF) may also perform the method 900 or parts of the method 900 thereof.

In some embodiments, the UPF may comprise the UPF 103 as illustrated in any one of FIGS. 2, 3, 4, 5*a-c* or 6*a-c* and it will be appreciated that the functionality described therein applies equally to the method 900.

Briefly, the method 900 comprises a method in a user plane function, UPF, of moving a session from an SFC to a new SFC. The SFC comprises a first SF that modifies packets in the session. In a first block 902, the method 900 comprises sending a third message to a session management function, SMF 107, the third message indicating that the first SF is modifying packets in the session. In a second block 904, the method comprises receiving from the SMF 107 a fourth message, the fourth message comprising updated policy control rules for the session, wherein the updated policy control rules comprise an indication of a new SFC for the session. In a third block 906 the method comprises moving the session from the SFC to the new SFC, based on the received updated policy control rules.

In block 902, the third message may comprise a message such as the signal 506 in FIG. 5*a* or the message 608 in FIG. 6*a*. In some embodiments, the step of sending a third message to the SMF 107 may be performed responsive to receiving a fifth message from the SMF 107, the fifth message comprising an instruction to the UPF 103 to commence SF Traffic behaviour reporting. The fifth message was described above, with respect to the method 800 and the detail therein will be understood to apply equally to the method 900. In some embodiments, the fifth message comprises a signal such as signal 301 in FIG. 3. As noted above, in some embodiments, the fifth message comprises one or more of a 5 tuple for the session, a new 5 tuple for the session, a TCP ACK number for the session and a TCP Sequence number for the session.

In block 904, the UPF 103 receives updated policy control rules for the session in a fourth message. The fourth message may comprise a message such as the signal 510 in FIG. 5*b* or the signal 612 in FIG. 6*b*. The updated policy control rules may be in the form of updated detection rules (e.g. PDRs) and/or instruction rules (for example, such as different enforcement actions, e.g. traffic steering, QoS, Charging/Reporting through FARs, QERs, and/or URRs).

In block 906, the method may comprise moving the session from the SFC to the new SFC based on the updated policy control rules. The session may be moved, for example, using a signal such as the signal 518 of FIG. 5*c* or the signal 622 in FIG. 6*c*.

In some embodiments the step of moving the session from the SFC to the new SFC in block 906 further comprises classifying packets comprised in the session using heuristic analysis and determining from the updated policy control rules that the session should be moved to the new SFC based on the results of the step of classifying packets. In other words, a session may be served by an (initial or default) SFC whilst a heuristic algorithm classifies packets in the session. Once the heuristic algorithm has classified the packets, the UPF 103 may use the received updated policy control rules to move the session to the new SFC. Because the new SFC is preconfigured for the session, based on the reported traffic modifications that were being performed on the original SFC, the session can be moved to the new SFC seamlessly, and without losing TCP connection.

As described above with respect to FIG. 2, in some embodiments, the method 900 may be preceded by a registration procedure whereby the UPF 103 registers SFs available to it with a SMF 107. For example, the method 900 may further comprise (for example, preceding the steps 902, 904 and 906) sending a registration message to the SMF 107, the registration message comprising information to register one or more SFs associated with the UPF 103, the information comprising: for each SF in the one or more SFs, i) an identifier for the respective SF and ii) an indication of any packet modifications performed by the respective SF. The registration message may, for example, be of the format of signal 201 or 203 in FIG. 2. If the UE registers itself in this way, the SMF 107 may better select an appropriate UPF for any given session (e.g. an appropriate UE may be selected at session establishment). In some embodiments, the registration message comprises a PFCP Association Request.

In some embodiments, the method 900 may further comprise the UPF 103 receiving a service continuity indicator associated with the session in a PFCP Session Establishment Request or a PFCP Session Modification Request as part of a session establishment procedure for the session. The method may further comprise routing session traffic from the SFC to the new SFC, based on the service continuity indicator. For example, if the service continuity indicator is "profile 3" as described above, the UPF 103 may determine that the service should not be interrupted and should thus be routed to the new SFC to ensure uninterrupted service. The service continuity procedure was described in detail above and the details therein will be understood to apply equally to the method 900.

Figure 10:
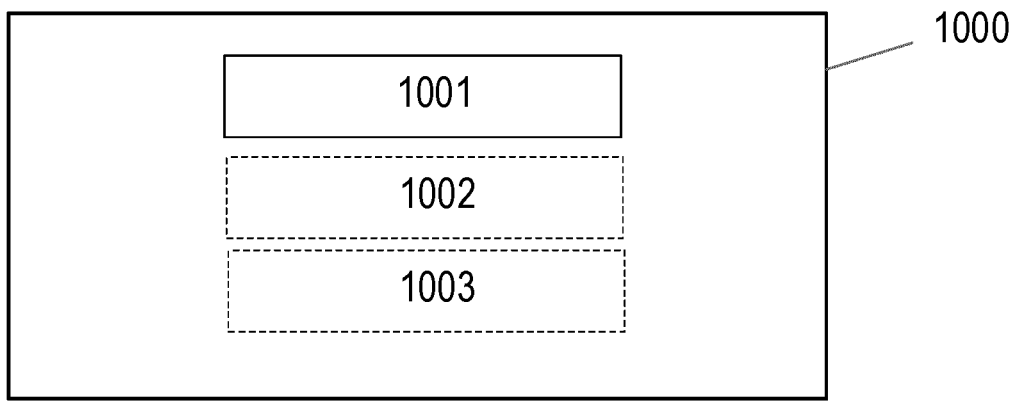
FIG. 10 shows an example network function node according to some embodiments herein.

Turning now to other embodiments, FIG. 10 illustrates a network function (NF) node 1000 comprising processing circuitry (or logic) 1001. It will be appreciated that the NF node 1000 may comprise one or more virtual machines running different software and/or processes. The NF node 1000 may therefore comprise one or more servers, switches and/or storage devices and/or may comprise cloud computing infrastructure that runs the software and/or processes.

In some embodiments, the NF node 1000 may comprise a Policy Control function (PCF) as described above. The processing circuitry 1001 controls the operation of the PCF 1000 and can implement the method 700 described herein in relation to a PCF 111. The processing circuitry 1001 can comprise one or more processors, processing units, multi-core processors or modules that are configured or programmed to control the PCF 1000 in the manner described herein. In some implementations, the processing circuitry 1001 can comprise a plurality of software and/or hardware modules that are each configured to perform, or are for performing, individual or multiple steps of the method 700 described herein in relation to the PCF 111.

The NF node 1000 may be configured for moving a session from a service function chain, SFC, to a new SFC, wherein the SFC comprises a first SF that modifies packets in the session. Briefly, the processing circuitry 1001 of the NF node 1000 may be configured to: determine to update a second SF in the SFC for the session; determining a new SFC for the session comprising new SFs, wherein the new SFs are selected based on the determined update to the second SF and information related to the packet modification performed by the first SF; and send a first message to a session management function, SMF, comprising updated policy control rules for the session, wherein the updated policy control rules comprise an indication of the new SFC for the session.

In some embodiments, the NF node 1000 may optionally comprise a communications interface 1002. The communications interface 1002 of the NF 1000 can be for use in communicating with other nodes, such as other virtual nodes. For example, the communications interface 1002 of the NF 1000 can be configured to transmit to and/or receive from other nodes or network functions requests, resources, information, data, signals, or similar. The processing circuitry 1001 of NF 1000 may be configured to control the communications interface 1002 of the NF 1000 to transmit to and/or receive from other nodes or network functions requests, resources, information, data, signals, or similar.

Optionally, the NF 1000 may comprise a memory 1003. In some embodiments, the memory 1003 of the NF 1000 can be configured to store program code that can be executed by the processing circuitry 1001 of the NF 1000 to perform any embodiment of the method 700 described herein. Alternatively or in addition, the memory 1003 of the NF 1000, can be configured to store any requests, resources, information, data, signals, or similar that are described herein. The processing circuitry 1001 of the NF 1000 may be configured to control the memory 1003 of the NF 1000 to store any requests, resources, information, data, signals, or similar that are described herein.

Figure 11:
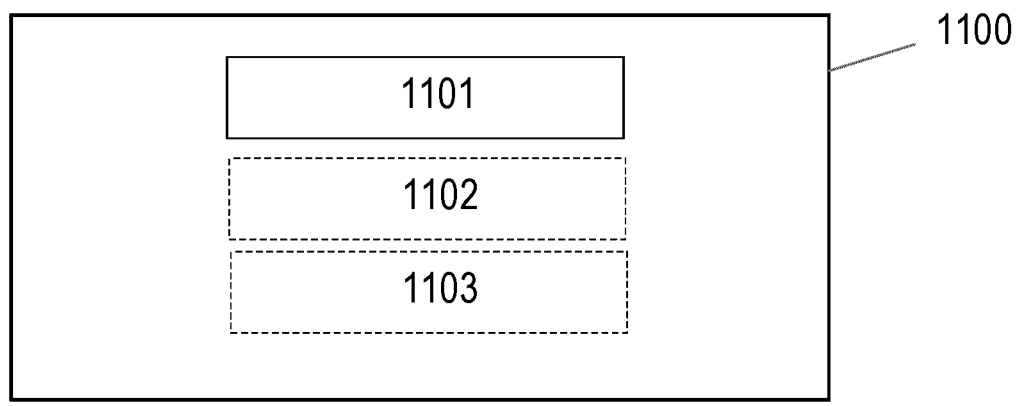
FIG. 11 shows an example network function node according to some embodiments herein.

Turning now to other embodiments, FIG. 11 illustrates a network function (NF) node 1100 comprising processing circuitry (or logic) 1101. It will be appreciated that the NF node 1100 may comprise one or more virtual machines running different software and/or processes. The NF node 1100 may therefore comprise one or more servers, switches and/or storage devices and/or may comprise cloud computing infrastructure that runs the software and/or processes.

In some embodiments, the NF node 1100 may comprise a Session Management Function (SMF) as described above. The processing circuitry 1101 controls the operation of the SMF 1100 and can implement the method 800 described herein in relation to a SMF 107. The processing circuitry 1101 can comprise one or more processors, processing units, multi-core processors or modules that are configured or programmed to control the SMF 1100 in the manner described herein. In some implementations, the processing circuitry 1101 can comprise a plurality of software and/or hardware modules that are each configured to perform, or are for performing, individual or multiple steps of the method 800 described herein in relation to the SMF 107.

The NF node 1100 may be configured for moving a session from a service function chain, SFC, to a new SFC, wherein the SFC comprises a first SF that modifies packets in the session. Briefly, the processing circuitry 1101 of the NF node 1100 may be configured to: responsive to receiving a third message from a user plane function, UPF, associated with the session, the third message indicating that the first SF is modifying packets in the session, sending a second message to a policy control function, PCF, comprising a request for updated policy control rules for the session, wherein the second message comprises information related to the modification being performed by the first SF; receive a first message from the PCF comprising the updated policy control rules for the session, wherein the updated policy control rules comprise an indication of a new SFC for the session, wherein the new SFC comprises new SFs selected by the PCF; and send a fourth message to the UPF, the fourth message comprising the updated policy control rules for the session.

In some embodiments, the NF node 1100 may optionally comprise a communications interface 1102. The communications interface 1102 of the NF 1100 can be for use in communicating with other nodes, such as other virtual nodes. For example, the communications interface 1102 of the NF 1100 can be configured to transmit to and/or receive from other nodes or network functions requests, resources, information, data, signals, or similar. The processing circuitry 1101 of NF 1100 may be configured to control the communications interface 1102 of the NF 1000 to transmit to and/or receive from other nodes or network functions requests, resources, information, data, signals, or similar.

Optionally, the NF 1100 may comprise a memory 1103. In some embodiments, the memory 1103 of the NF 1100 can be configured to store program code that can be executed by the processing circuitry 1101 of the NF 1100 to perform any of the embodiments of method 900 described herein. Alternatively or in addition, the memory 1103 of the NF 1100, can be configured to store any requests, resources, information, data, signals, or similar that are described herein. The processing circuitry 1101 of the NF 1100 may be configured to control the memory 1103 of the NF 1100 to store any requests, resources, information, data, signals, or similar that are described herein.

Figure 12:
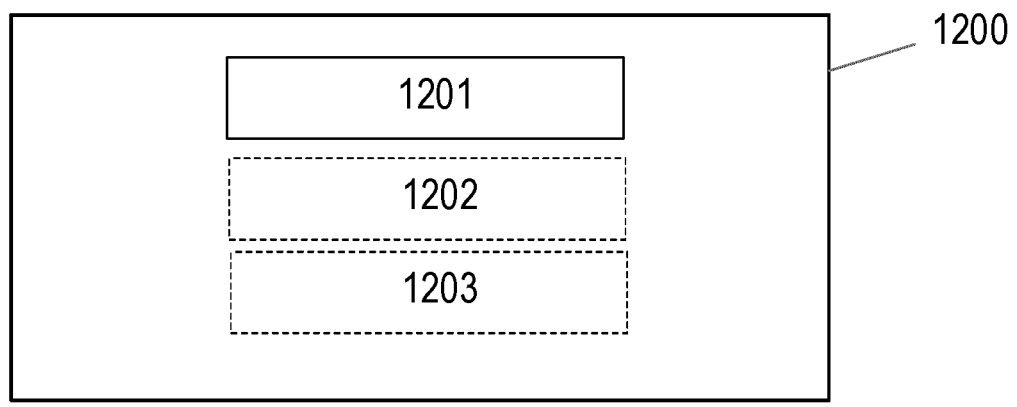
FIG. 12 shows an example network function node according to some embodiments herein.

Turning now to other embodiments, FIG. 12 illustrates a network function (NF) node 1200 comprising processing circuitry (or logic) 1201. It will be appreciated that the NF node 1200 may comprise one or more virtual machines running different software and/or processes. The NF node 1200 may therefore comprise one or more servers, switches and/or storage devices and/or may comprise cloud computing infrastructure that runs the software and/or processes.

In some embodiments, the NF node 1200 may comprise a User Plane Function (UPF) as described above. The processing circuitry 1201 controls the operation of the UPF 1200 and can implement the method 900 described herein in relation to a UPF 103. The processing circuitry 1201 can comprise one or more processors, processing units, multi-core processors or modules that are configured or programmed to control the UPF 1200 in the manner described herein. In some implementations, the processing circuitry 1201 can comprise a plurality of software and/or hardware modules that are each configured to perform, or are for performing, individual or multiple steps of the method 900 described herein in relation to the UPF 103.

The NF node 1200 may be configured for moving a session from a service function chain, SFC to a new SFC, wherein the SFC comprises a first SF that modifies packets in the session. Briefly, the processing circuitry 1201 of the NF node 1200 may be configured to: send a third message to a session management function, SMF, the third message indicating that the first SF is modifying packets in the session; receive from the SMF a fourth message, the fourth message comprising updated policy control rules for the session, wherein the updated policy control rules comprise an indication of a new SFC for the session; and move the session from the SFC to the new SFC, based on the received updated policy control rules.

In some embodiments, the NF node 1200 may optionally comprise a communications interface 1202. The communications interface 1202 of the NF 1200 can be for use in communicating with other nodes, such as other virtual nodes. For example, the communications interface 1202 of the NF 1200 can be configured to transmit to and/or receive from other nodes or network functions requests, resources, information, data, signals, or similar. The processing circuitry 1201 of NF 1200 may be configured to control the communications interface 1202 of the NF 1200 to transmit to and/or receive from other nodes or network functions requests, resources, information, data, signals, or similar.

Optionally, the NF 1200 may comprise a memory 1203. In some embodiments, the memory 1203 of the NF 1200 can be configured to store program code that can be executed by the processing circuitry 1201 of the NF 1200 to perform any of the embodiments of method 900 described herein. Alternatively or in addition, the memory 1203 of the NF 1200, can be configured to store any requests, resources, information, data, signals, or similar that are described herein. The processing circuitry 1201 of the NF 1200 may be configured to control the memory 1203 of the NF 1200 to store any requests, resources, information, data, signals, or similar that are described herein.

Turning to other embodiments, there is also a computer program product comprising a computer readable medium, the computer readable medium having computer readable code embodied therein, the computer readable code being configured such that, on execution by a suitable computer or processor, the computer or processor is caused to perform any of the embodiments of the methods 700, 800 or 900 described herein.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

Annex I-Table of UP Function Features

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.x). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | N4 | The UPF supports allocating UE IP addresses or prefixes (see clause 5.21). |

-continued

Annex I-Table of UP Function Features

| Feature Octet/Bit | Feature | Interface | Description |
|---|---|---|---|
| 7/4 | SSET | N4 | UPF support of PFCP sessions successively controlled by different SMFs of a same SMF Set (see clause 5.22). |
| 7/5 | SFN | Sxb, Sxc, N4 | Number of Service Function included in the capabilities of UPF |
| 7/6 | SFId | Sxb, Sxc, N4 | Identifier of the Service Function |
| 7/7 | SFTB | Sxb, Sxc, N4 | Traffic Behavior of the Service Function |

Annex II-PDI IE within PFCP Session Establishment Request

| Octet 1 and 2 | | PDI IE Type = 2 (decimal) Length = n | | | | | |
|---|---|---|---|---|---|---|---|
| Octets 3 and 4 | | | | | Appl. | | |
| Information elements | P | Condition/Comment | Sxa | Sxb | Sxc | N4 | IE Type |
| Source Interface | M | This IE shall identify the source interface of the incoming packet. | X | X | X | X | Source Interface |
| Local F-TEID | O | This IE shall not be present if Traffic Endpoint ID is present. If present, this IE shall identify the local F-TEID to match for an incoming packet. The CP function shall set the CHOOSE (CH) bit to 1 if the UP function supports the allocation of F-TEID and the CP function requests the UP function to assign a local F-TEID to the PDR. | X | X | — | X | F-TEID |
| Network Instance | O | This IE shall not be present if Traffic Endpoint ID is present. It shall be present if the CP function requests the UP function to allocate a UE IP address/prefix and the Traffic Endpoint ID is not present. If present, this IE shall identify the Network instance to match for the incoming packet. See NOTE 1, NOTE2. | X | X | X | X | Network Instance |
| UE IP address | O | This IE shall not be present if Traffic Endpoint ID is present. If present, this IE shall identify the source or destination IP address to match for the incoming packet. (NOTE 5) The CP function shall set the CHOOSE (CH) bit to 1 if the UP function supports the allocation of UE IP address/prefix and the CP function requests the UP function to assign a UE IP address/prefix to the PDR. | — | X | X | X | UE IP address |
| Traffic Endpoint ID | C | This IE may be present if the UP function has indicated the support of PDI optimization. If present, this IE shall uniquely identify the Traffic Endpoint for that PFCP session. | X | X | X | X | Traffic Endpoint ID |
| SDF Filter | O | If present, this IE shall identify the SDF filter to match for the incoming packet. Several IEs with the same IE type may be present to provision a list of SDF Filters. The full set of applicable SDF filters, if any, shall be provided during the creation or the modification of the PDI. See NOTE 3. | — | X | X | X | SDF Filter |
| Application ID | O | If present, this IE shall identify the Application ID to match for the incoming packet. | — | X | X | X | Application ID |
| Ethernet PDU Session Information | O | This IE may be present to identify all the (DL) Ethernet packets matching an Ethernet PDU session (see clause 5.13.1). | — | — | — | X | Ethernet PDU Session Information |
| Ethernet Packet Filter | O | If present, this IE shall identify the Ethernet PDU to match for the incoming packet. Several IEs with the same IE type may be present to represent a list of Ethernet Packet Filters. The full set of applicable Ethernet Packet filters, if any, shall be provided during the creation or the modification of the PDI. | — | — | — | X | Ethernet Packet Filter |
| QFI | O | If present, this IE shall identify the QoS Flow Identifier to match for the incoming packet. Several IEs with the same IE type may be present to provision a list of QFIs. When present, the full set of applicable QFIs shall be provided during the creation or the modification of the PDI. | — | — | — | X | QFI |

Annex II-PDI IE within PFCP Session Establishment Request

Octet 1 and 2: PDI IE Type = 2 (decimal) Length = n

Octets 3 and 4

| Information elements | P | Condition/Comment | Sx a | Sx b | Sx c | N4 | IE Type |
|---|---|---|---|---|---|---|---|
| Framed-Route | O | This IE may be present for a DL PDR if the UPF indicated support of Framed Routing (see clause 8.2.25). If present, this IE shall describe a framed route. Several IEs with the same IE type may be present to provision a list of framed routes. (NOTE 5) | — | X | — | X | Framed-Route |
| Framed-Routing | O | This IE may be present for a DL PDR if the UPF indicated support of Framed Routing (see clause 8.2.25). If present, this IE shall describe a framed route. | — | X | — | X | Framed-Routing |
| Framed-IPv6-Route | O | This IE may be present for a DL PDR if the UPF indicated support of Framed Routing (see clause 8.2.25). If present, this IE shall describe a framed IPV6 route. Several IEs with the same IE type may be present to provision a list of framed IPv6 routes. (NOTE 5) | — | X | — | X | Framed-IPv6-Route |
| Source Interface Type | O | This IE may be present to indicate the 3GPP interface type of the source interface, if required by functionalities in the UP Function, e.g. for performance measurements. | X | X | — | X | 3GPP Interface Type |
| Service Continuity | O | This IE shall be present if UPF needs to apply different continuity policies | — | X | X | X | Service Continuity |

NOTE 1:
The Network Instance parameter is needed e.g. in the following cases: PGW/TDF UP function supports multiple PDNs with overlapping IP addresses; SGW UP function is connected to PGWs in different IP domains (S5/S8); PGW UP function is connected to SGWs in different IP domains (S5/S8); SGW UP function is connected to eNodeBs in different IP domains; UPF is connected to 5G-ANs in different IP domains.
NOTE 2:
When a Local F-TEID is provisioned in the PDI, the Network Instance shall relate to the IP address of the F-TEID. Otherwise, the Network Instance shall relate to the UE IP address if provisioned or the destination IP address in the SDF filter if provisioned
NOTE 3:
SDF Filter IE(s) shall not be present if Ethernet Packet Filter IE(s) is present.
NOTE 4:
When several SDF filter IEs are provisioned, the UP function shall consider that the packets are matched if matching any SDF filter. The same principle shall apply for Ethernet Packet Filters and QFIs.
NOTE 5:
If both the UE IP Address and the Framed-Route (or Framed-IPV6-Route) are present, the packets which are considered being matching the PDR shall match at least one of them.

Annex III: Service Continuity Information IE

| Octet 1 and 2 | Usage Report IE Type = 80 (decimal) | |
|---|---|---|
| Octets 3 and 4 | Length = n | |
| Information elements | P  Condition/Comment | IE Type |
| Service Continuity Profile | M  The name of the Service Continuity profile. | Service Continuity Profile |

The invention claimed is:

1. A method in a policy control function (PCF) of moving a session from a service function chain (SFC) to a new SFC, wherein the SFC comprises a first service function (SF) that modifies packets in the session, the method comprising:
   determining to update a second SF in the SFC for the session;
   determining a new SFC for the session comprising new SFs, wherein the new SFs are selected based on the determined update to the second SF and information related to the packet modification performed by the first SF; and
   sending a first message to a session management function, SMF, comprising updated policy control rules for the session, wherein the updated policy control rules comprise an indication of the new SFC for the session.

2. The method of claim 1 wherein the method is performed responsive to receiving a second message from the SMF comprising a request for updated policy control rules for the session, wherein the second message further comprises the information related to the packet modification performed by the first SF.

3. The method of claim 1 wherein the method is performed responsive to receiving a service continuity indicator for the session wherein the service continuity indicator indicates that the session should be maintained.

4. The method of claim 3 wherein the service continuity indicator is obtained by the PCF from a unified data repository (UDR) as part of a session establishment procedure for the session.

5. The method of claim 1 wherein determining a new SFC for the session comprising new SFs comprises:
   determining that the first SF will not be included in the new SFC; and
   selecting a compensatory SF as one of the new SFs, wherein the compensatory SF is configured to ensure TCP ACK number consistency between the SFC and the new SFC in view of the packet modification performed by the first SF in the SFC.

6. A method in a session management function (SMF) of moving a session from a service function chain (SFC) to a new SFC, wherein the SFC comprises a first service function (SF) that modifies packets in the session, the method comprising:
   responsive to receiving a third message from a user plane function, UPF, associated with the session, the third message indicating that the first SF is modifying packets in the session, sending a second message to a policy control function (PCF) comprising a request for updated policy control rules for the session, wherein the second message comprises information related to the modification being performed by the first SF;

receiving a first message from the PCF comprising the updated policy control rules for the session, wherein the updated policy control rules comprise an indication of a new SFC for the session, wherein the new SFC comprises new SFs selected by the PCF; and sending a fourth message to the UPF, the fourth message comprising the updated policy control rules for the session.

7. The method of claim 6 wherein the third message comprises one or more of:
a 5 tuple for the session;
a new 5 tuple for the session;
a TCP ACK number for the session; and
a TCP Sequence number for the session.

8. The method of claim 6 further comprising sending a fifth message to the UPF, the fifth message comprising an instruction to the UPF to commence SF Traffic behaviour reporting; and wherein the third message is received from the UPF in response to the fifth message.

9. The method of claim 6 wherein sending a fourth message to the UPF, the fourth message comprising the updated policy control rules for the session, further comprises:
determining one or more detection rules and/or instruction rules based on the updated policy control rules for the session wherein at least one instruction rule comprises an indication of the new SFC; and
sending the one or more detection rules and/or instruction rules to the UPF in the fourth message.

10. The method of claim 6 further comprising:
receiving registration messages from a plurality of UPFs, each registration message comprising registration information to register one or more SFs associated with the UPF, the registration information comprising: for each SF in the one or more SFs, i) an identifier for the respective SF and ii) an indication of any packet modifications performed by the respective SF.

11. The method of claim 10 wherein each registration message comprises a PFCP Association Request.

12. The method of claim 10 further comprising:
using the registration messages to select, from the plurality of UPFs, the UPF associated with the session.

13. The method of claim 10 further comprising receiving from the PCF, as part of a session establishment procedure for the session, an indication of a service continuity indicator for the session wherein the service continuity indicator indicates one of the following:
that the session can be restarted;
that the session can be broken and continued; or
that the session should be continuous.

14. The method of claim 13 wherein if the service continuity indicator indicates that that the session should be continuous, the method further comprises:
selecting, from the plurality of UPFs, a UPF with traffic modification capability as the UPF associated with the session.

15. A method in a user plane function (UPF) of moving a session from a service function chain (SFC) to a new SFC, wherein the SFC comprises a first service function (SF) that modifies packets in the session, the method comprising:
sending a third message to a session management function (SMF) the third message indicating that the first SF is modifying packets in the session;
receiving from the SMF a fourth message, the fourth message comprising updated policy control rules for the session, wherein the updated policy control rules comprise an indication of a new SFC for the session; and
moving the session from the SFC to the new SFC, based on the received updated policy control rules.

16. The method of claim 15 wherein the step of moving the session from the SFC to the new SFC further comprises:
classifying packets comprised in the session using heuristic analysis; and
determining from the updated policy control rules that the session should be moved to the new SFC based on the results of the step of classifying packets.

17. The method of claim 15 wherein the step of sending a third message to the SMF is performed responsive to receiving a fifth message from the SMF, the fifth message comprising an instruction to the UPF to commence SF Traffic behaviour reporting.

18. The method of claim 15 wherein the third message comprises one or more of:
a 5 tuple for the session;
a new 5 tuple for the session;
a TCP ACK number for the session; and
a TCP Sequence number for the session.

19. The method of claim 15 further comprising:
sending a registration message to the SMF, the registration message comprising information to register one or more SFs associated with the UPF, comprising: for each SF in the one or more SFs, i) an identifier for the respective SF and ii) an indication of any packet modifications performed by the respective SF.

20. The method of claim 19 wherein the registration message comprises a PFCP Association Request.

* * * * *